United States Patent
Alzahrani

(10) Patent No.: US 10,293,932 B2
(45) Date of Patent: May 21, 2019

(54) MULTI-MODE UNMANNED AERIAL VEHICLE

(71) Applicant: Saeid A. Alzahrani, Lafayette, IN (US)

(72) Inventor: Saeid A. Alzahrani, Lafayette, IN (US)

(*) Notice: Subject to any disclaimer, the term of this patent is extended or adjusted under 35 U.S.C. 154(b) by 349 days.

(21) Appl. No.: 15/372,667

(22) Filed: Dec. 8, 2016

(65) Prior Publication Data

US 2017/0369162 A1 Dec. 28, 2017

Related U.S. Application Data

(63) Continuation-in-part of application No. 15/195,238, filed on Jun. 28, 2016, now Pat. No. 10,040,548.

(51) Int. Cl.
| | |
|---|---|
| *B64C 29/00* | (2006.01) |
| *B64C 25/22* | (2006.01) |
| *B64C 39/02* | (2006.01) |
| *B64C 27/52* | (2006.01) |
| *B64C 3/38* | (2006.01) |

(52) U.S. Cl.
CPC ........... *B64C 29/0033* (2013.01); *B64C 3/38* (2013.01); *B64C 25/22* (2013.01); *B64C 27/52* (2013.01); *B64C 39/024* (2013.01); *B64C 2201/021* (2013.01); *B64C 2201/027* (2013.01); *B64C 2201/102* (2013.01); *B64C 2201/108* (2013.01); *B64C 2201/141* (2013.01)

(58) Field of Classification Search
CPC ..... B64C 29/00; B64C 29/0033; B64C 29/02; B64C 3/38; B64C 39/024
See application file for complete search history.

(56) References Cited

U.S. PATENT DOCUMENTS

| | | | |
|---|---|---|---|
| 3,002,712 A * | 10/1961 | Beckwith | B64C 27/20 244/17.23 |
| 3,291,242 A | 12/1966 | Tinajero | |
| D274,511 S | 7/1984 | Clifton | |
| D274,512 S | 7/1984 | Clifton | |

(Continued)

FOREIGN PATENT DOCUMENTS

RU      2 283 795 C1     9/2006

OTHER PUBLICATIONS

Yongjun Seo, et al., "Modeling and Attitude Control of Tri-Tilt Ducted Fan Vehicle", AIAA Guidance, Navigation, and Control Conference, Sci Tech, http://arc.aiaa.org/doi/abs/10.2514/6.2016-0103, 2016, 3 pages (Abstract only).

(Continued)

*Primary Examiner* — Justin M Benedik
(74) *Attorney, Agent, or Firm* — Oblon, McClelland, Maier & Neustadt, L.L.P.

(57) ABSTRACT

A multi-mode unmanned aerial vehicle includes an elongated fuselage, a right and left fixed wing extending from a respective right and left side of the elongated fuselage, a right and left tilt wing attached at a first side to a free end of the respective right and left fixed wing, a right and left duct attached to a second side of the respective right and left tilt wing, a right and left winglet attached to the respective right and left duct opposite to the right and left tilt wing, a tilt tail located within a curved guide slot at a rear end of the elongated fuselage, a rear duct attached to the tilt tail, a tilting mechanism, and an integrated autonomous flight control system.

20 Claims, 39 Drawing Sheets

(56) References Cited

U.S. PATENT DOCUMENTS

| | | |
|---|---|---|
| D302,676 S | 8/1989 | Clifton |
| 4,880,071 A | 11/1989 | Tracy |
| D311,719 S | 10/1990 | Haga |
| 5,823,468 A | 10/1998 | Bothe |
| 6,708,920 B2 | 3/2004 | Fukuyama |
| D493,411 S | 7/2004 | Fong |
| D500,008 S | 12/2004 | Bulaga |
| 6,843,447 B2 | 1/2005 | Morgan |
| 6,886,776 B2 | 5/2005 | Wagner et al. |
| 6,892,980 B2 | 5/2005 | Kawai |
| 7,246,769 B2 | 7/2007 | Yoeli |
| 7,410,122 B2 | 8/2008 | Robbins et al. |
| 7,472,863 B2 | 1/2009 | Pak |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,857,254 B2 | 12/2010 | Parks |
| 7,874,513 B1 | 1/2011 | Smith |
| 7,918,416 B2 | 4/2011 | Yoeli |
| 7,946,528 B2 | 5/2011 | Yoeli |
| 8,020,804 B2 | 9/2011 | Yoeli |
| 8,181,903 B2 | 5/2012 | Posva |
| D665,333 S | 8/2012 | Oliver |
| 8,342,441 B2 | 1/2013 | Yoeli |
| 8,496,200 B2 | 7/2013 | Yoeli |
| 8,505,846 B1 * | 8/2013 | Sanders, II ............. B64C 29/02 244/7 A |
| 8,622,335 B2 | 1/2014 | Yoeli |
| 8,777,150 B2 | 7/2014 | Wang |
| 8,800,912 B2 | 8/2014 | Oliver |
| 8,833,692 B2 | 9/2014 | Yoeli |
| 8,876,038 B2 | 11/2014 | Yoeli |
| 10,011,351 B2 * | 7/2018 | McCullough ........... B64C 29/02 |
| 2003/0062443 A1 * | 4/2003 | Wagner .................... B64C 3/56 244/12.3 |
| 2006/0226281 A1 * | 10/2006 | Walton .................... B64C 27/20 244/17.23 |
| 2007/0018035 A1 | 1/2007 | Saiz et al. |
| 2007/0246601 A1 | 10/2007 | Layton |
| 2009/0127379 A1 | 5/2009 | Lugg |
| 2012/0043413 A1 * | 2/2012 | Smith ................. B64C 29/0033 244/12.4 |
| 2012/0091257 A1 | 4/2012 | Wolff et al. |
| 2013/0112804 A1 * | 5/2013 | Zhu ..................... B64C 29/0025 244/2 |
| 2014/0151502 A1 | 6/2014 | Kosheleff |
| 2014/0339372 A1 * | 11/2014 | Dekel ................. B64C 29/0033 244/7 R |

OTHER PUBLICATIONS

"A3 EDF drone", Nicklindenmuth, http://www.thingiverse.com/thing:687381, Feb. 18, 2015, 3 pages.

Batchu Chandra Sekhar, et al., Studies on the Reactivity of New Types of Tetracyclic-1,5-Benzoxazepines: Part V, Department of Chemistry, Indian Institute of Technology, XP 55196157, Mar.-Apr. 2001, 1 page (Abstract only).

R. Saiganesh, et al., "A Selective Cathodic Reduction of β-Chlorovinylimines in N, N' Dimethylformamide", Tetrahedron Letters, vol. 30, No. 13, 1989, pp. 1711-1714.

* cited by examiner

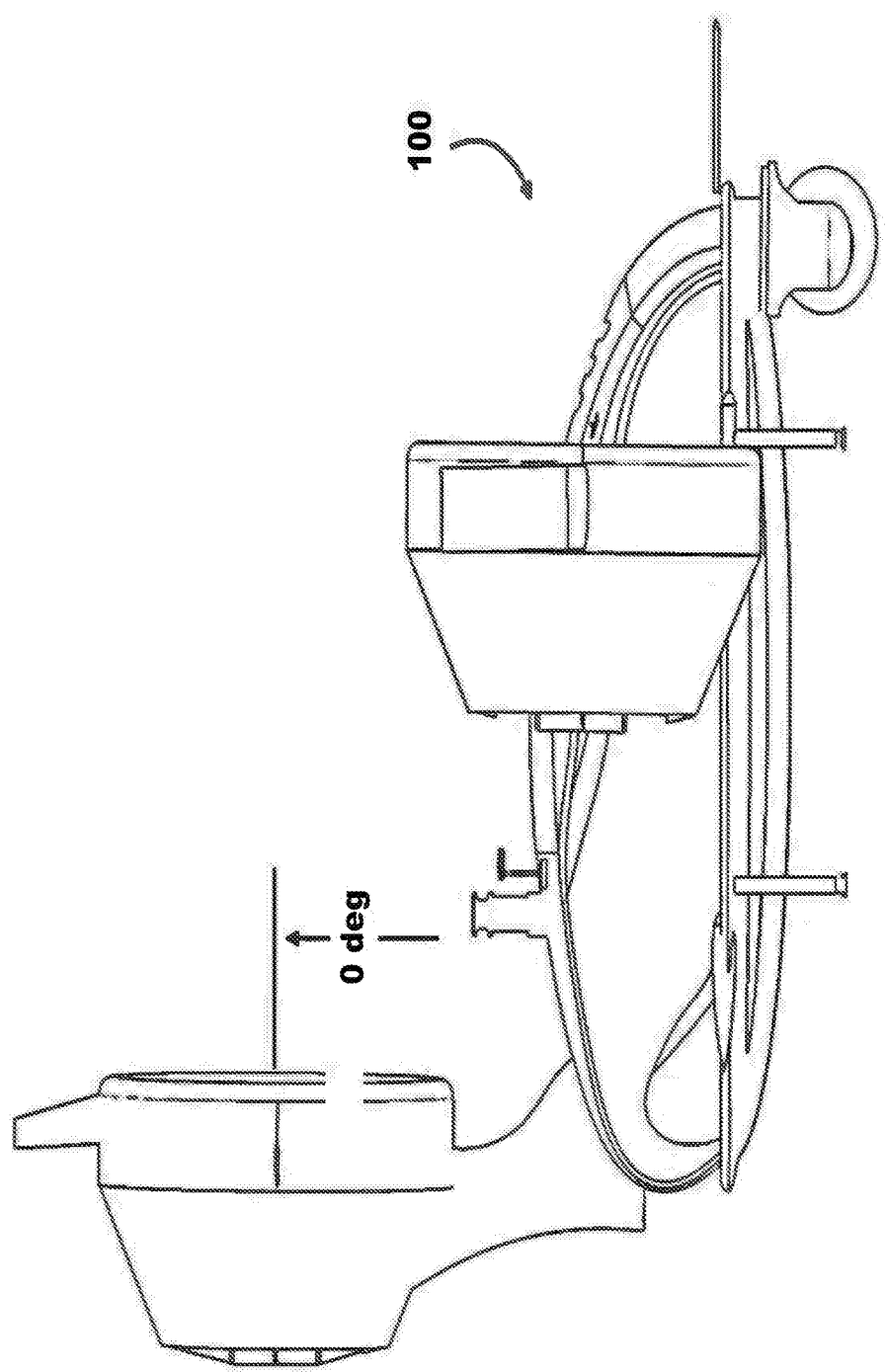

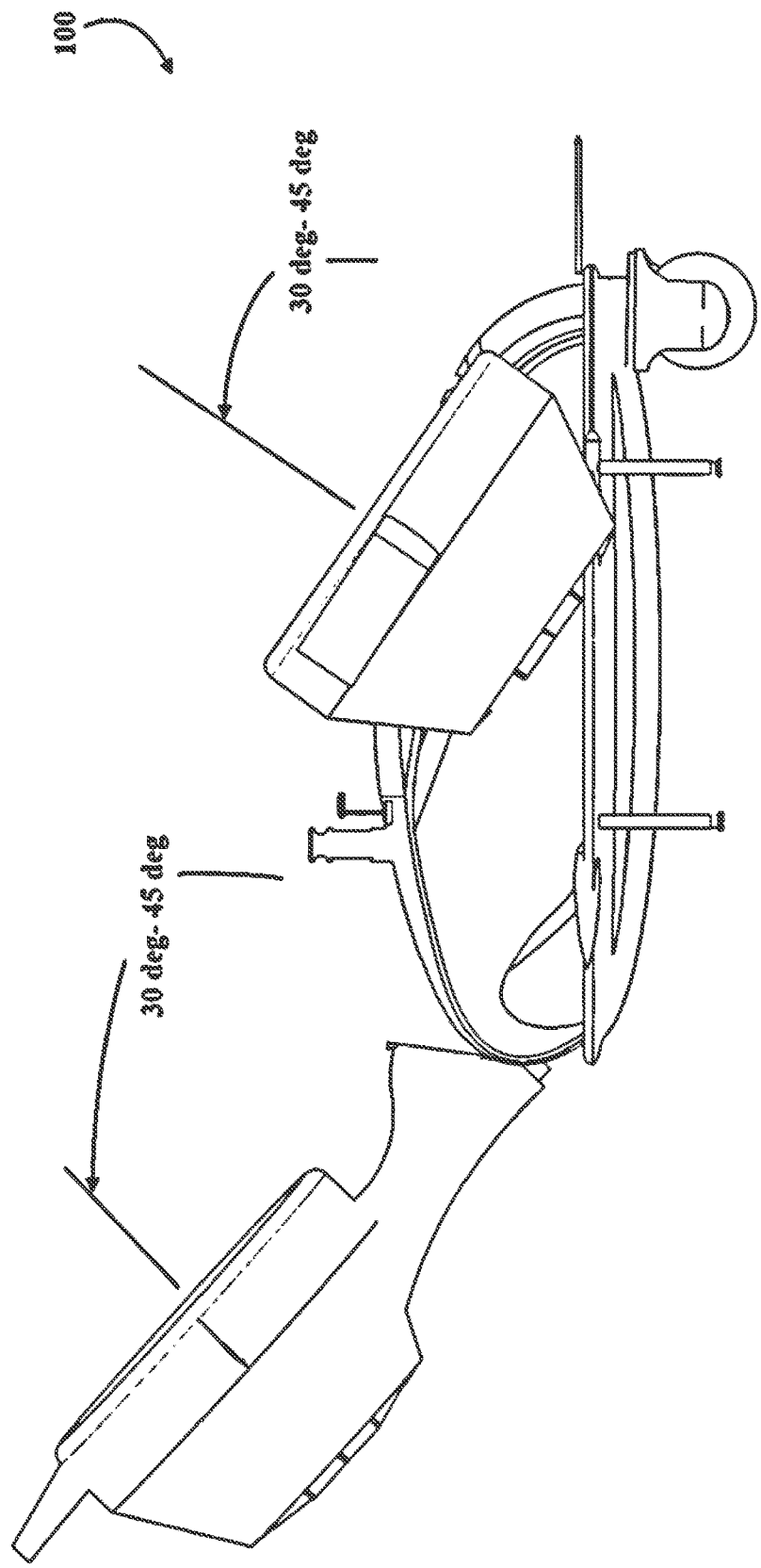

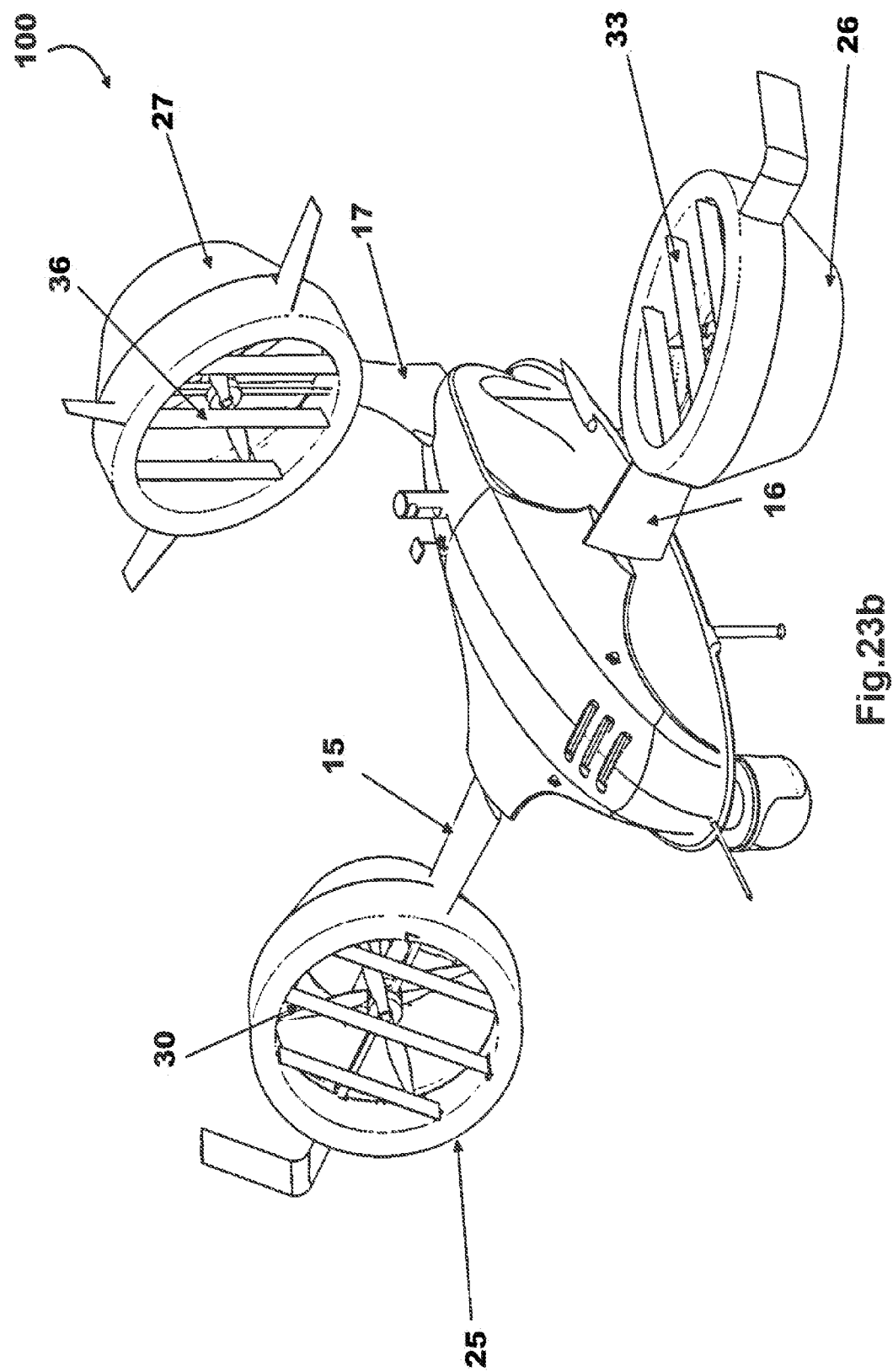

MULTI-MODE UNMANNED AERIAL VEHICLE

RELATED APPLICATION

This application is a continuation-in-part of U.S. application Ser. No. 15/195,238, filed on Jun. 28, 2016, which is incorporated by reference herein in its entirety.

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention in the United States.

BACKGROUND

Description of Related Art

The aviation industry has worked at improving vertical take-off and landing (VTOL) and short take-off and landing (STOL) aerial vehicles. The use of VTOL/STOL aerial vehicles is significantly efficient. One challenge has been to design an aerial vehicle that can take-off, land, and hover like a helicopter and also possess speed, range, payload capacity, and operational features of a fixed-wing aircraft.

The unmanned aerial vehicle (UAV) market is growing at a fast and dynamic pace within the aviation industry. In the past few years, the majority of the UAVs market growth had been in support of military and security operations. Today, commercial UAVs are shaping and changing many industries around the world and they are increasingly associated to civilian operations with interest in a range of high risk and labor-intensive industries to help minimize operating costs, mitigate safety risks, and improve decision-making.

The thrust of a nozzle-vectored fixed-wing VTOL/STOL aerial vehicle is generated by a jet engine or a turbo-fan engine which is vectored, channeled, and directed by nozzles downward to provide vertical lift. It is subsequently redirected horizontally for horizontal flight. However, one problem of this aerial vehicle is the large amount of fuel required to accomplish full throttle for the aerial vehicle to hover. As a result, the aerial vehicle's horizontal flight times and ranges are reduced.

Helicopters are a commonly used rotary-wing aerial vehicle and are considered by many to be successful VTOL/STOL aerial vehicles. However, there are performance and safety issues with a helicopter. The performance of a helicopter is limited by its forward speed. It also has a limited range due to its inefficiency compared to a fixed-wing aircraft in which most of the lifting force is provided by the wings when it moves forward. Helicopter safety is limited due to problems, such as a loss of the tail rotor or rotor strike, ground resonance, loss of control during negative G flight, dynamic roll-over, anti-torque rotor failures, auto rotations, and the requirement to find an open landing site.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

In one embodiment, a multi-mode unmanned aerial vehicle includes an elongated fuselage having a front end, a rear end with a curved guide slot, a right side, a left side, and a WIG-effect bottom; a right-fixed wing extending from the right side of the elongated fuselage; a right tilt wing attached at a first side to a free end of the right fixed wing, the right tilt wing being rotatable in a range of 0-135 degrees about a lateral axis of the multi-mode unmanned aerial vehicle; a right duct attached to a second side of the right tilt wing; a right winglet attached to the right duct opposite to the right tilt wing; a left-fixed wing extending from the left side of the elongated fuselage; a left tilt wing attached at a first side to a free end of the left fixed wing, the left tilt wing being rotatable in a range of 0-135 degrees about the lateral axis of the multi-mode unmanned aerial vehicle; a left duct attached to a second side of the left tilt wing; a left winglet attached to the left duct opposite to the left tilt wing; a tilt tail located within the curved guide slot at the rear end of the elongated fuselage, the tilt tail being rotatable in a range of 0-90 degrees about the lateral axis of the multi-mode unmanned aerial vehicle within the curved guide slot; a rear duct attached to the tilt tail, the tilt tail includes a vertical stabilizer, a right horizontal stabilizer, and a left horizontal stabilizer; a tilting mechanism having a first set of servo actuators connected via a bevel gear group to a right and left set of horizontally-oriented shafts integrated with the right tilt wing and the left tilt wing respectively, a set of pulleys connected to the right and left set of horizontally-oriented shafts, and a second set of servo actuators connected to a rear shaft integrated with the tilt tail; and an integrated autonomous flight control system configured with processing circuitry to control flight and navigation of the multi-mode unmanned aerial vehicle and to control the tilting mechanism.

The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 22a is a side schematic view of a multi-mode UAV in a HTOL mode according to one embodiment;

FIG. 22c is a side schematic view of a multi-mode UAV in a STOL mode according to one embodiment;

FIG. 23b illustrates a multi-mode UAV in a yaw mode according to one embodiment;

DETAILED DESCRIPTION

There is a need to develop simple, safe, and fully or semi-autonomous UAVs for a range of military and commercial applications with the ability to take-off and land vertically in complex urban areas and provide satisfactory horizontal speed to accomplish longer forward flight endurance.

Embodiments described herein provide a multi-mode unmanned aerial vehicle that is capable of vertical take-off and landing (VTOL), short take-off and landing (STOL), horizontal take-off and landing (HTOL), and configured to skim, boat, and cruise over water surfaces. In an embodiment, the multi-mode UAV is a fully or semi-autonomously controlled, and gyroscopically stabilized multi-purpose (sky-land-sea) UAV. The multi-mode UAV can take off and land from a wide variety of locations without the requirement of an airport runway or a landing pad.

Current-day military and commercial UAV applications make it desirable to deploy a ducted fan UAV in which the overall flight safety is improved. In addition, the substantial noise level from the lift rotors is suppressed by enclosing the lift rotors inside ducts while operating in outdoor environments, indoor environments, and complex urban areas. A complex area could include a densely populated area in which multiple-floor buildings and/or skyscrapers are situated in a close vicinity to each other. In addition, streets may have little or no shoulder areas. There may also be multiple types of regions situated in a close vicinity to each other, such as residential, business, commercial, and industrial regions.

The challenge is to design a UAV that can take-off, land, and hover like a helicopter and possesses speed, range, payload capacity, and operational features of a fixed-wing aircraft. That design challenge is overcome in accordance with embodiments described herein by combining a fixed-wing configuration, a tilt-wing configuration, a ducted fan configuration, a counter-rotating rotor configuration, and a WIG configuration in a tilt-wing tri-ducted fan platform. Advantages of this combination include higher aerodynamic performance, higher stability, greater controllability, better maneuverability, safer operating conditions, and quieter flight capabilities. A tilt-wing tri-ducted fan platform reduces the likelihood of failure, and it streamlines development, reduces costs, and saves space. In addition, it reduces the complexity of the UAV by using a multi-purpose platform, rather than a separate configuration for each function. Most of the existing UAVs are generally designed for specific functions and are therefore not conveniently capable of performing a multiplicity of functions.

Figure 1:
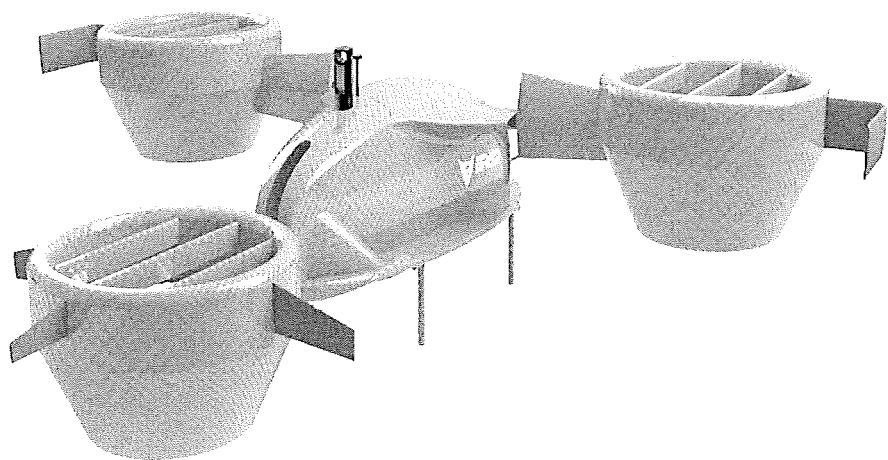
FIG. 1 is a rear perspective view of a multi-mode UAV in a VTOL mode according to one embodiment.
Figure 2:
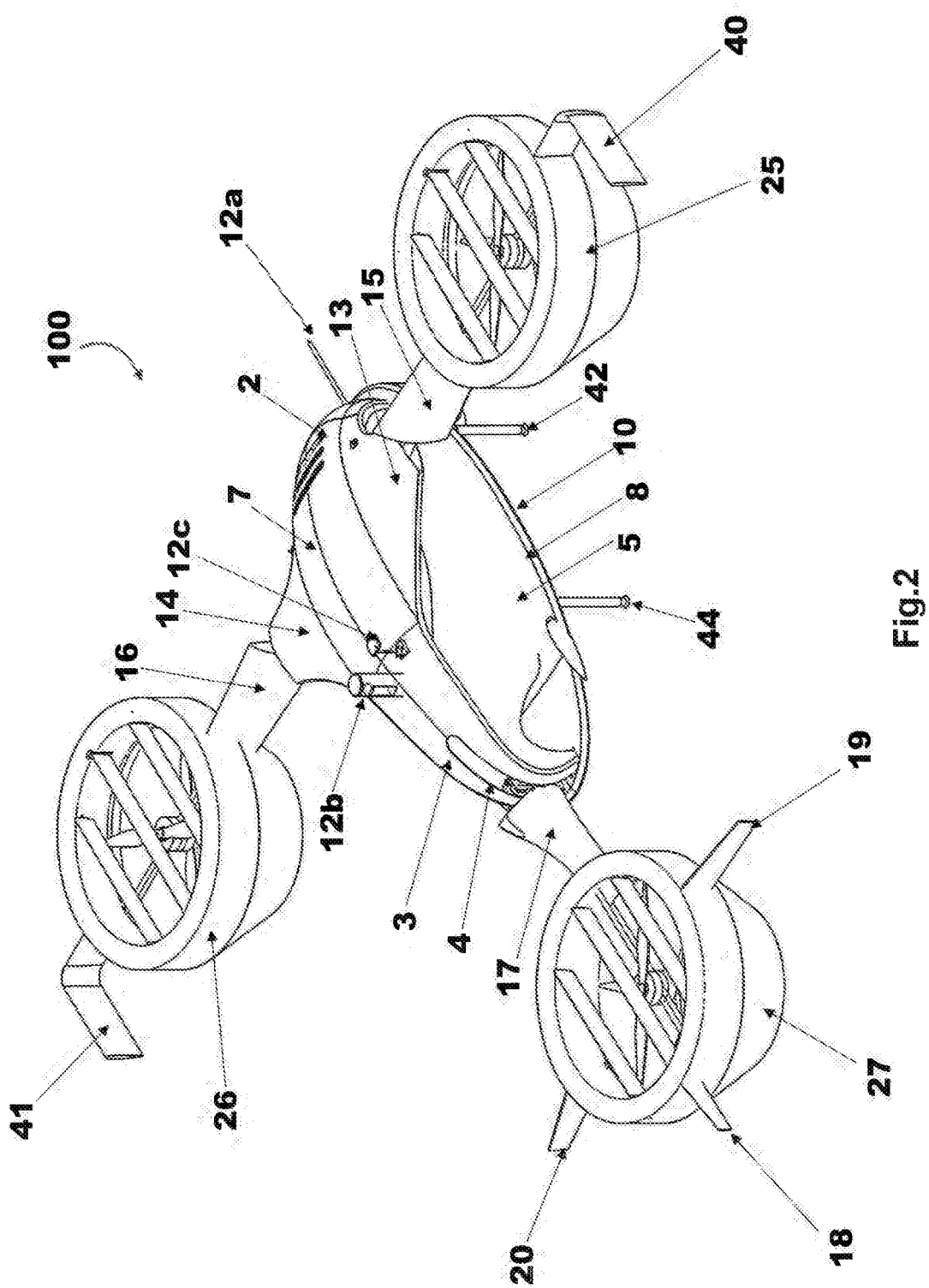
FIG. 2 is a rear perspective schematic view of a multi-mode UAV in a VTOL mode according to one embodiment.
Figure 3:
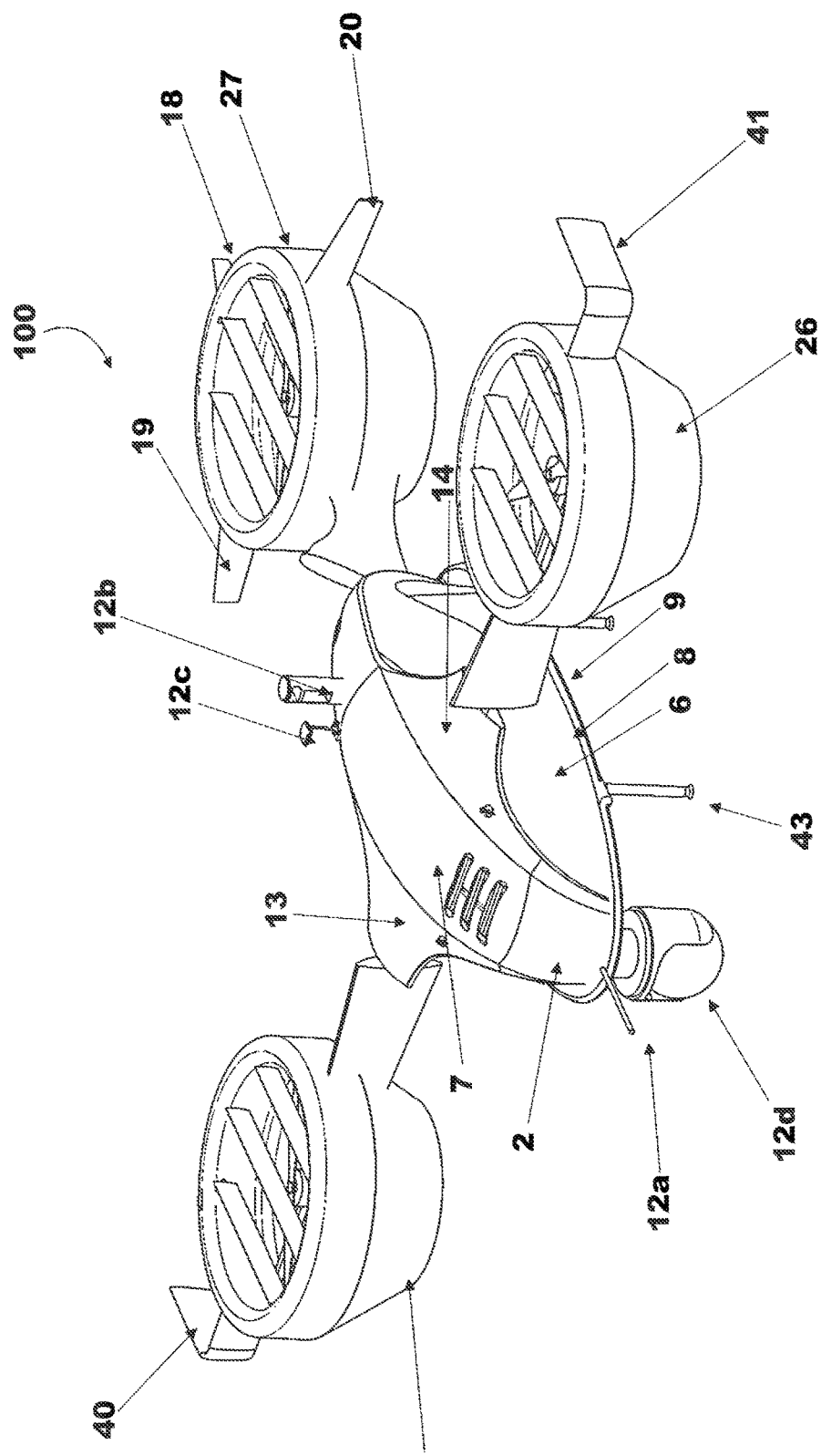
FIG. 3 is a front perspective schematic view of a multi-mode UAV in a VTOL mode according to one embodiment.
Figure 4:
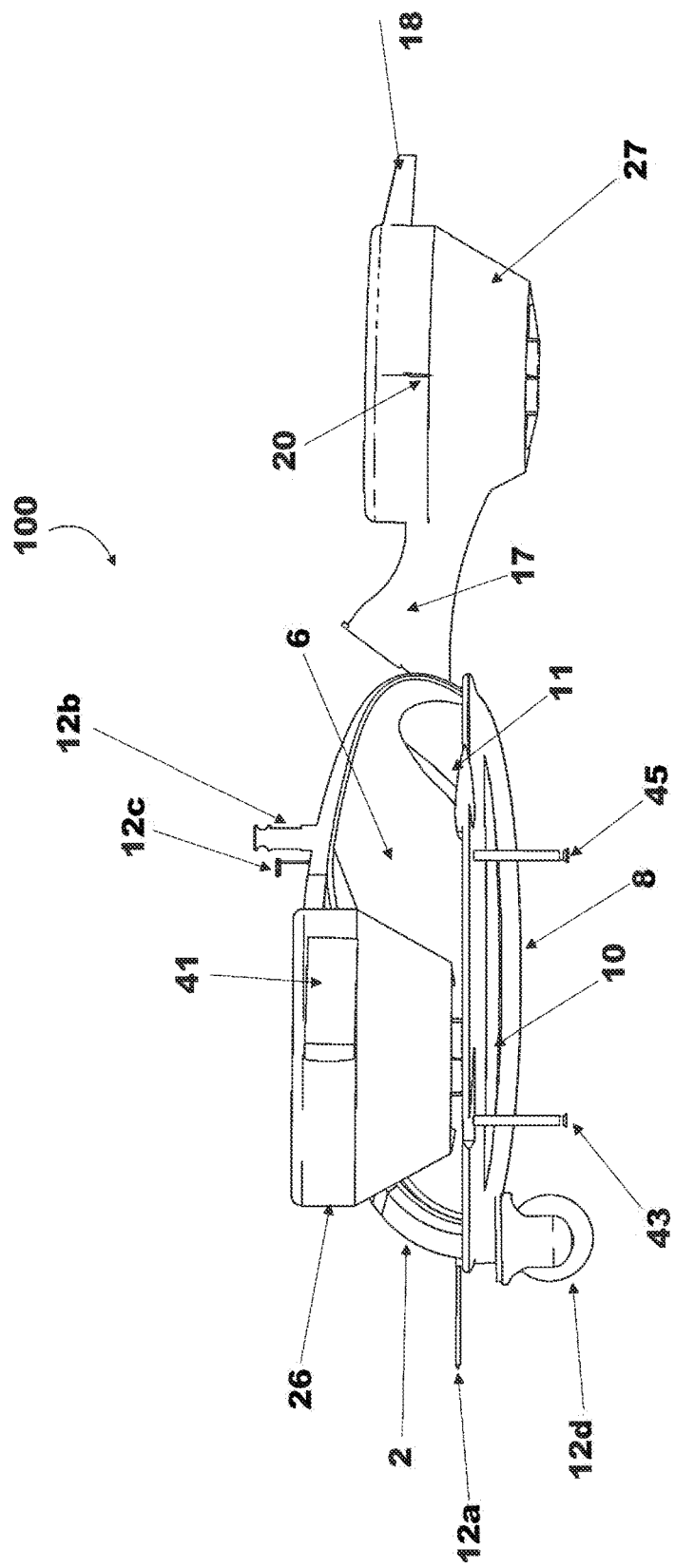
FIG. 4 is a left-side schematic view of a multi-mode UAV in a VTOL mode according to one embodiment.
Figure 5:
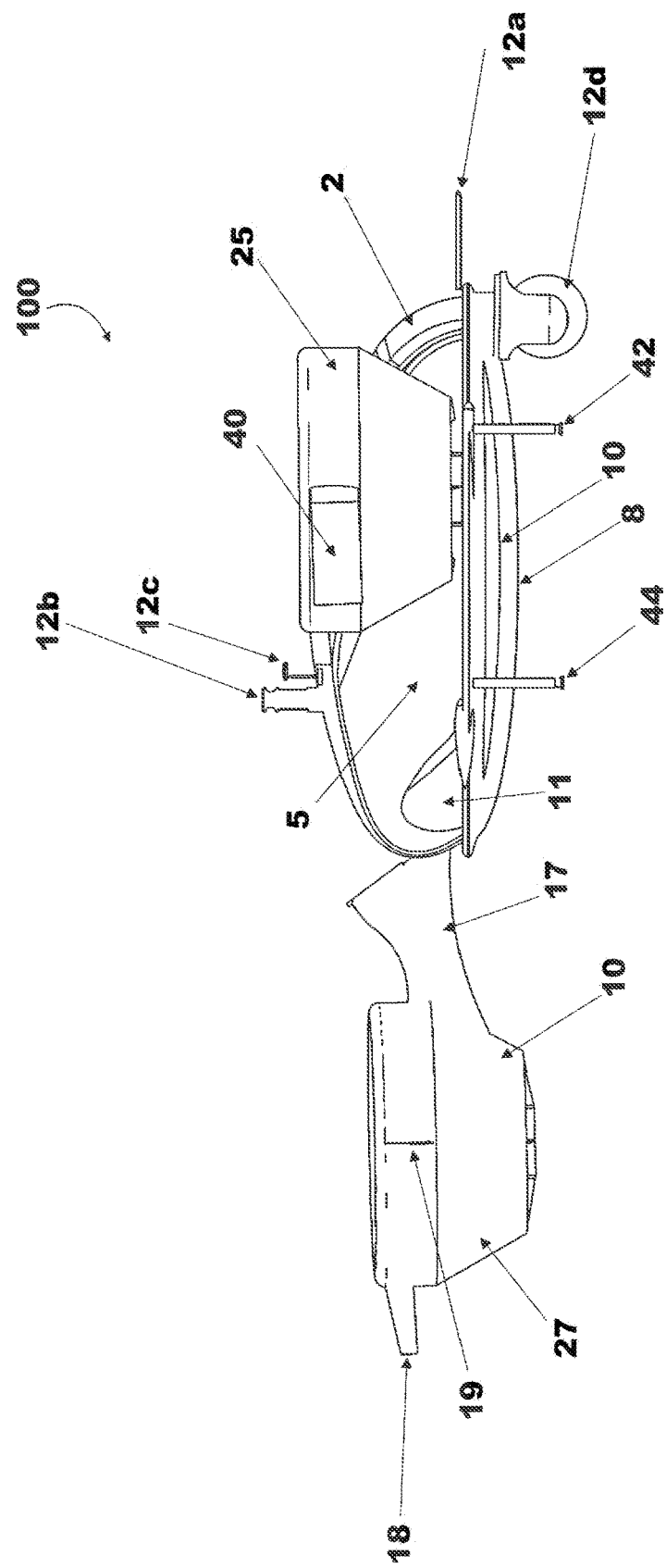
FIG. 5 is a right-side schematic view of a multi-mode UAV in a VTOL mode according to one embodiment.
Figure 6:
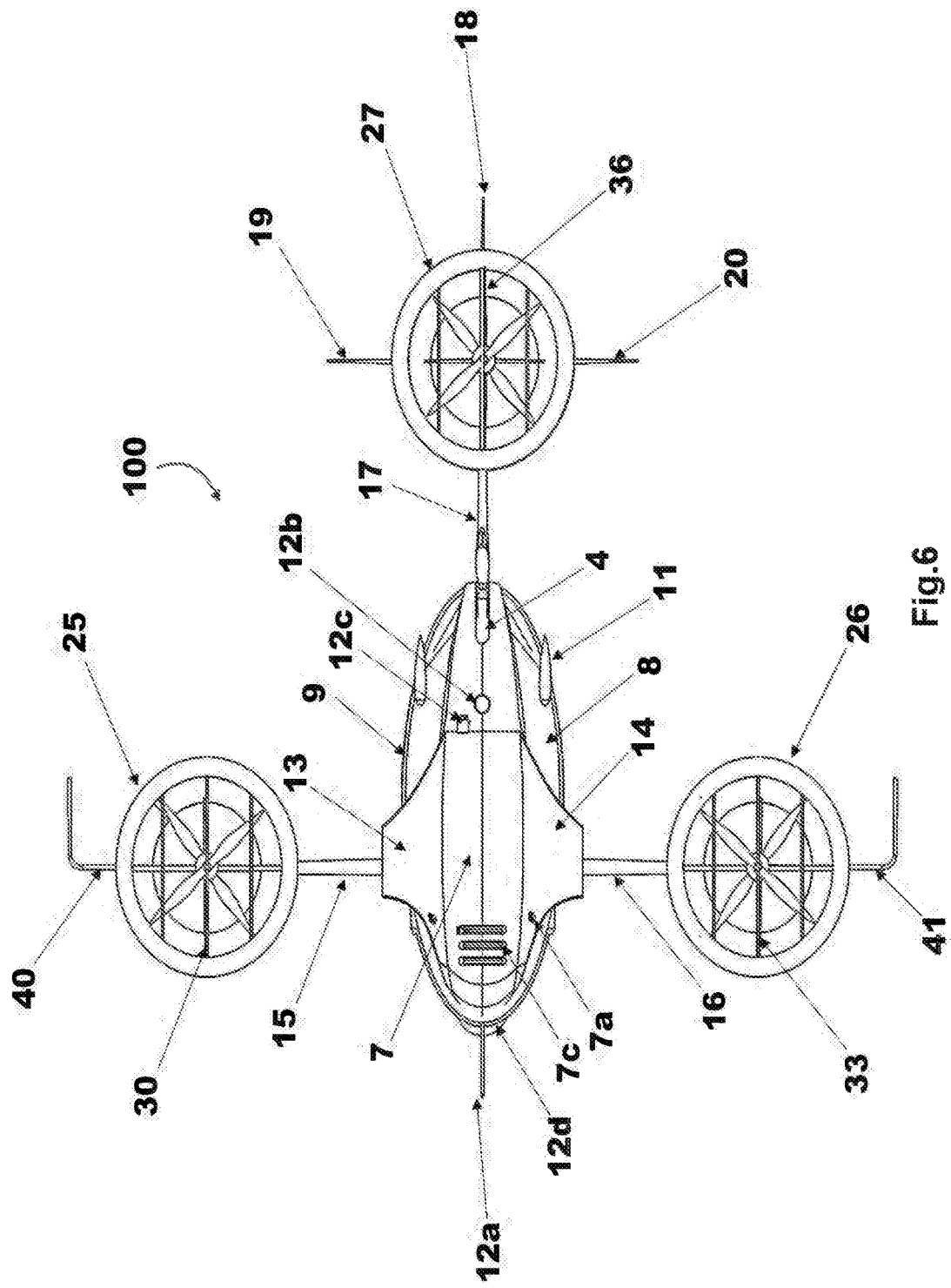
FIG. 6 is a top schematic view of a multi-mode UAV in a VTOL mode according to one embodiment.
Figure 7:
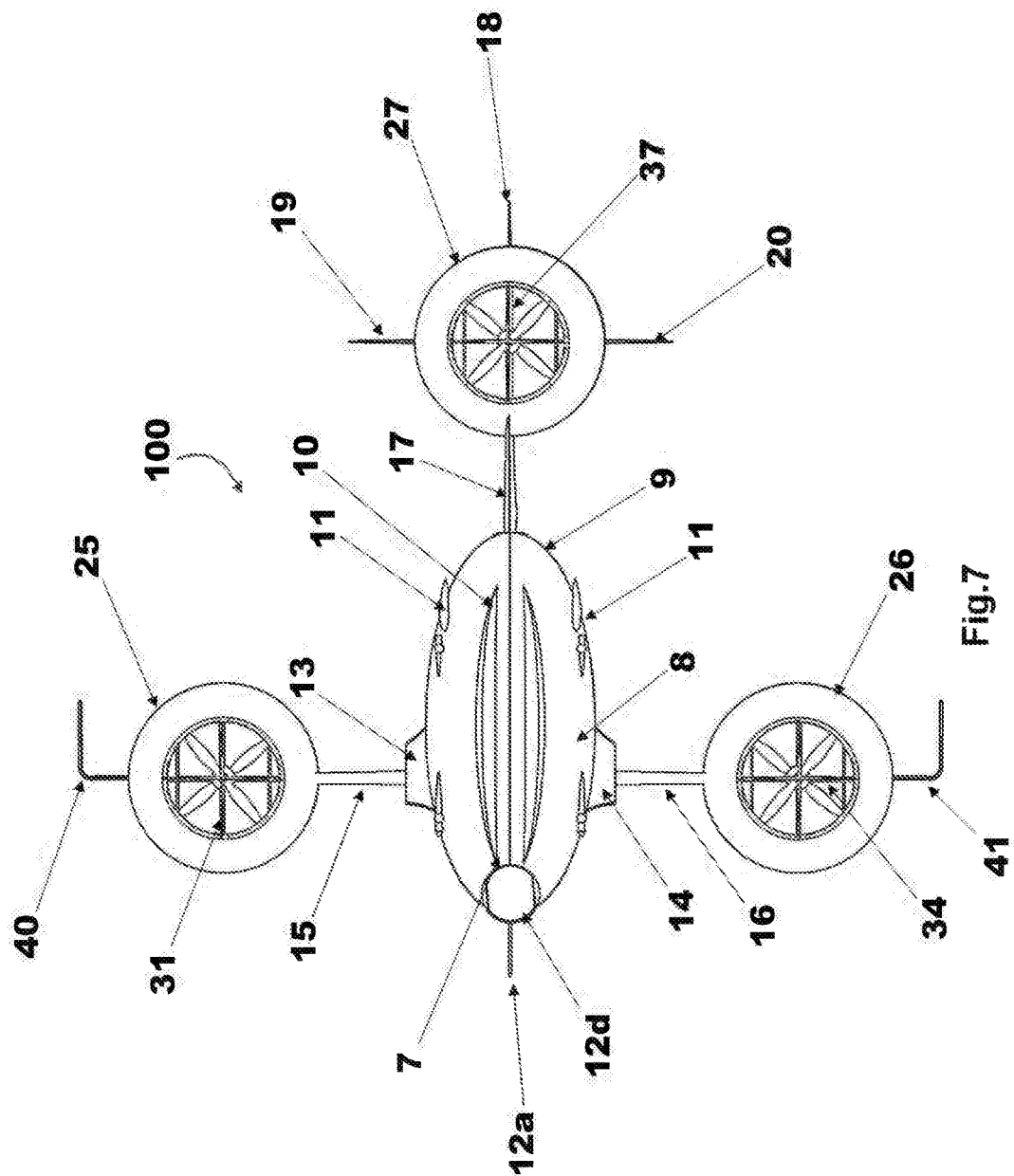
FIG. 7 is a bottom schematic view of a multi-mode UAV in a VTOL mode according to one embodiment.

FIG. 1 is a rear perspective view of an exemplary multi-mode UAV in a VTOL mode. FIGS. 2-7 are schematic views of an exemplary multi-mode UAV 100 in a VTOL mode according to embodiments described herein. Only some of the reference numbers are illustrated in each figure. FIGS. 1 and 2 are rear perspective views of the multi-mode UAV 100. FIG. 3 is a front perspective view of the multi-mode UAV 100. FIG. 4 is a left-side view of the multi-mode UAV 100. FIG. 5 is a right-side view of the multi-mode UAV 100. FIG. 6 is a top view of the multi-mode UAV 100. FIG. 7 is a bottom view of the multi-mode UAV 100.

An elongated fuselage 1 of the multi-mode UAV 100 has a front end 2, a rear end 3, a curved guide slot 4, two opposite facing sides of a right side 5 and a left side 6, and a front container hinged door 7. A WIG-effect bottom 8 includes a surrounding ring cavity 9, bottom stabilizers 10, and rear stabilizers 11. The Wing-In-Ground (WIG) effect bottom design provides high hydrodynamic performance to the multi-mode UAV while skimming and cruising over water surfaces.

Blended Wing Body (BWB) right Ogival Delta wing 13 and a left Ogival Delta wing extend from opposite sides of the elongated fuselage 1. A Blended Wing Body (BWB) is a fixed-wing that has a smooth-curved surface without a clear dividing line between the wing and the fuselage of the vehicle. Thus, the right and left Ogival Delta wings 13 and 14 are fixed and doubled over the lateral axis of the vehicle, wherein the lateral axis runs along the length of the wing. The Blended Wing Body (BWB) Ogival Delta wing design provides high aerodynamic performance to the multi-mode UAV 100 by achieving a greater lift-to-drag (L/D) ratio.

A first side of a right small tilt wing 15 is attached to the right Ogival Delta wing 13 at a side opposite to the elongated fuselage 1. A first side of a left small tilt wing 16 is attached to the left Ogival Delta wing 14 at a side opposite to the elongated fuselage 1.

A right diamond-shaped duct 25 is attached to a second side of the right small tilt wing 15, opposite to the right Ogival Delta wing 13. The diamond shape is achieved by varying the top and bottom cross sections of the duct. The diamond shape design provides more thrust, vertical lift, and horizontal speed to the multi-mode UAV 100. A right flexible rubber winglet 40 is attached to the right diamond-shaped duct 25, opposite to the right small tilt wing 15. The right flexible rubber winglet 40 is configured to provide more aerodynamic performance in HTOL mode compared to a regular winglet, and it works as a bumper crash guard for the multi-mode UAV 100 when hovering in direct contact with an object while in the VTOL mode. The right flexible rubber winglet 40 provides safer operations in confined spaces and in close vicinity to obstructions, residences, and people.

A left diamond-shaped duct 26 is attached to a second side of the left small tilt wing 16, opposite to the left Ogival Delta wing 14. A left flexible rubber winglet 41 is attached to the left diamond-shaped duct 26, opposite to the left small tilt wing 16. The left flexible rubber winglet 41 is configured to provide more aerodynamic performance in HTOL mode compared to a regular winglet, and it works as a bumper crash guard for the multi-mode UAV 100 when hovering in direct contact with an object while in the VTOL mode. The left flexible rubber winglet 41 provides safer operations in confined spaces and in close vicinity to obstructions, residences, and people.

A rear diamond-shaped duct 27 is mounted on a tilt tail 17 at the rear end 3 of the multi-mode UAV 100. A vertically-oriented rear shaft integrated within the body of the tilt tail 17 will be described in more detail herein with reference to FIG. 24.

A vertical stabilizer 18 is located at a far end of the rear diamond-shaped duct 27. A right horizontal stabilizer 19 is located at the right side of the rear diamond-shaped duct 27, and a left horizontal stabilizer 20 is located at the left side of the rear diamond-shaped duct 27.

A right front adjustable and slidable landing gear outer member 42 is illustrated in FIGS. 2 and 5, which will be described in more detail herein with reference to FIG. 32. A left front adjustable and slidable landing gear outer member 43 is illustrated in FIGS. 3 and 4, which will be described in more detail herein with reference to FIG. 32. A right rear adjustable and slidable landing gear outer member 44 is also illustrated in FIGS. 2 and 5, which will be described in more detail herein with reference to FIG. 32. A left rear adjustable and slidable landing gear outer member 45 is illustrated in FIG. 4, which will be described in more detail herein with reference to FIG. 32.

A front storage container hinged door 7 is illustrated in FIGS. 2, 3, and 6 which will be described in more detail herein with reference to FIG. 29.

A plurality of airborne onboard sensors are illustrated in FIGS. 2, 3, 4, 5, and 6 including a pitot tube 12a having a speed sensor, an altimeter, an air pressure sensor, a static air pressure sensor, a differential air pressure sensor, a magnetometer 12c, a light detection and ranging (LIDAR) sensor 12b, and dual infrared/electro-optical (IR/EO) sensors 12d. Theses sensors work in conjunction with the integrated autonomous flight control system 3430 to detect, sense, see, and avoid obstacles and potential collisions, which will be described in more detail herein with reference to FIG. 34. This enables the vehicle to make decisions by identifying obstacles and avoiding potential collisions with other local vehicles flying in the same airspace class. Moreover, the flight control unit (FCU) 3431 obtains and processes the data from the onboard sensors and manages their data inputs and outputs.

In a VTOL mode, each of the right diamond-shaped duct 25, the left diamond-shaped duct 26, and the rear diamond-shaped duct 27 is in a horizontal position at zero degrees relative to the lateral axis of the elongated fuselage 1. The diamond-shaped ducts 25, 26, and 27 are rotated to the horizontal position about their respective right small tilt wing 15, left small tilt wing 16, and the curved guide slot 4. This provides a thrust in a horizontal direction from each of the diamond-shaped ducts 25, 26, and 27.

FIG. 6 illustrates three pivotal control surfaces 30 evenly and horizontally positioned at a top entrance of the right diamond-shaped duct 25. FIG. 6 also illustrates three pivotal control surfaces 33 evenly and horizontally positioned at a top entrance of the left diamond-shaped duct 26, and three pivotal control surfaces 36 evenly and horizontally positioned at a top entrance of the rear diamond-shaped duct 27. The right, left, and rear pivotal control surfaces 30, 33, and 36 will be described in more detail herein with reference to FIGS. 25, 26, and 27, respectively.

Figure 25:
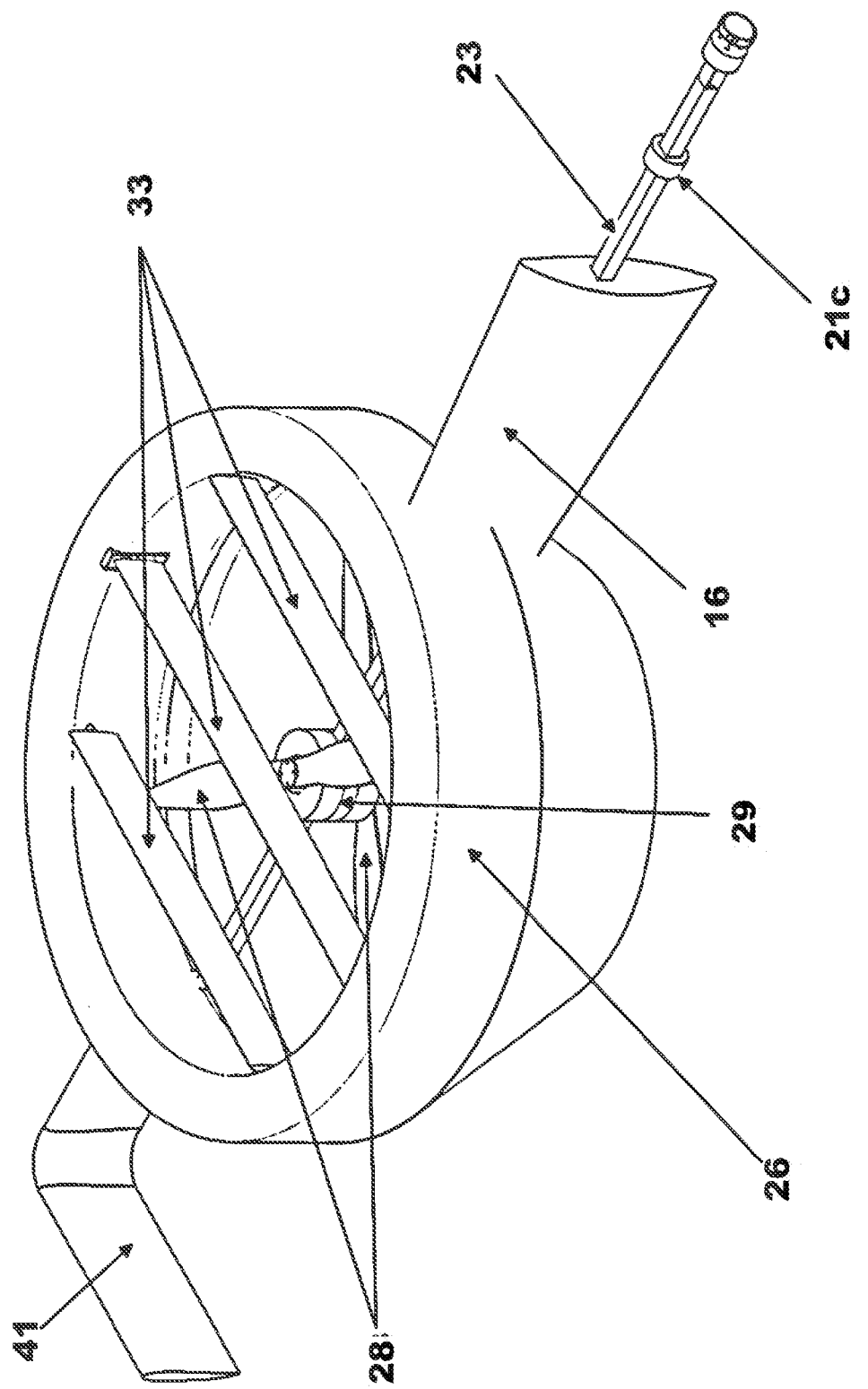
FIG. 25 illustrates a perspective schematic view of left diamond-shaped duct components according to one embodiment.

FIG. 25 illustrates the left diamond-shaped duct 26 which has three pivotal control surfaces 33 evenly and horizontally positioned at a top entrance of the left diamond-shaped duct 26. Dual counter-rotating rotors 28 are located on an underside position relative to the left pivotal control surfaces 33. Dual brushless electric motors or fuel-powered motors 29 are located centrally within the left diamond-shaped duct 26. FIG. 25 also illustrates a left horizontally-oriented shaft with frictionless pulley 21c. The right diamond-shaped duct 25 is similarly arranged with corresponding similar components. Likewise, the rear diamond-shaped duct 27 is similarly arranged with corresponding similar components.

Figure 26:
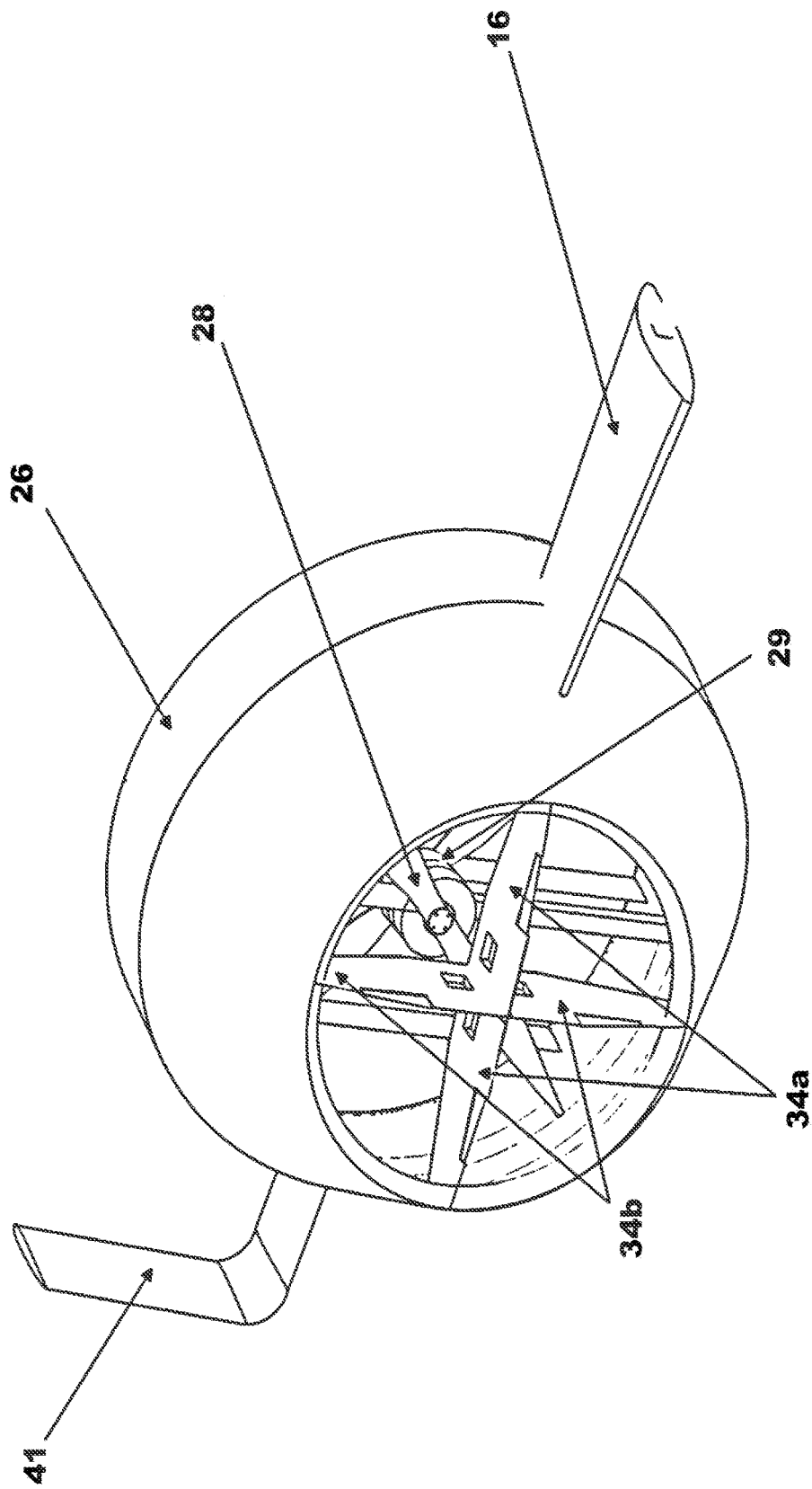
FIG. 26 illustrates a perspective schematic view of left diamond-shaped duct components according to one embodiment.

FIG. 26 illustrates an opposite view of the left diamond-shaped duct 26, relative to FIG. 25. Left duct vertically-positioned cross stators 34b are located on the back entrance of the left diamond-shaped duct 26, along with left duct horizontally-positioned cross stators 34a. FIG. 26 illustrates two left duct vertically-positioned cross stators 34b and two left duct horizontally-positioned cross stators 34a. However, more than two left duct vertically-positioned or horizontally-positioned cross stators are contemplated by embodiments described herein. The right diamond-shaped duct 25 is similarly arranged with corresponding right duct vertically-positioned cross stators and right duct horizontally-positioned cross stators. Likewise, the rear diamond-shaped duct 27 is similarly arranged with corresponding rear duct vertically-positioned cross stators and rear duct horizontally-positioned cross stators.

Figure 27:
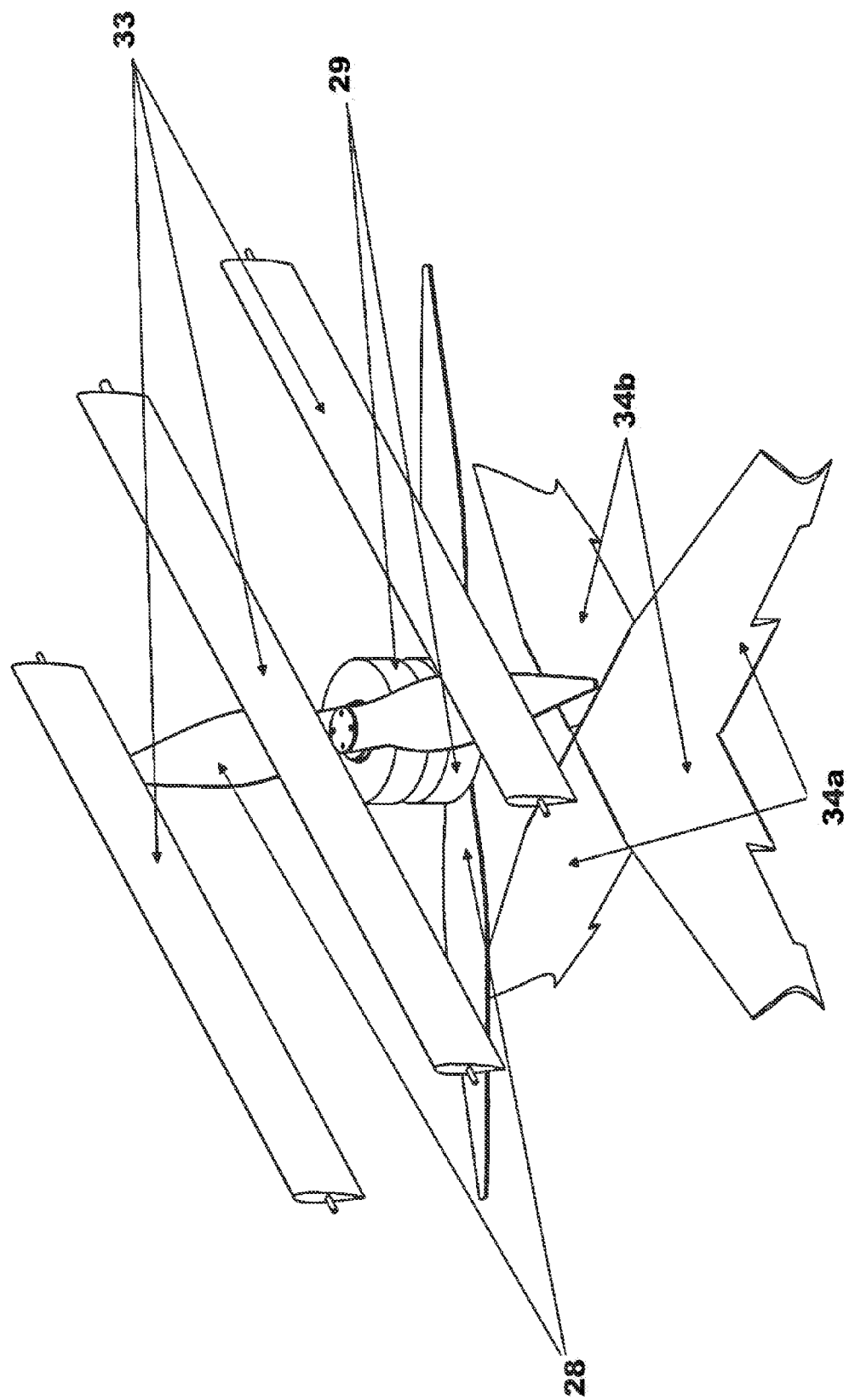
FIG. 27 illustrates a detail of diamond-shaped ducts according to one embodiment.

FIG. 27 illustrates the left pivotal control surfaces 33, along with the left duct vertically-positioned stators 34b and the left duct horizontally-positioned stators 34a in more detail. The three pivotal control surfaces 30 are similarly arranged in which the right duct vertically-positioned cross stators and the right duct horizontally-positioned cross stators have right duct stator pivotal control surfaces. Likewise, the rear pivotal control surfaces 36 are similarly arranged in which the rear duct vertically-positioned stators and the rear duct horizontally-positioned stators have rear duct stator pivotal control surfaces.

The right diamond-shaped duct 25, the left diamond-shaped duct 26, and the rear diamond-shaped duct 27 are configured to develop more thrust, vertical lift, and forward horizontal speed. The dual counter-rotating rotors 28 mounted on the dual brushless electric motors or fuel-powered motors 29 are configured to ensure the multi-mode UAV 100 is hovering without having a spinning torque, such as a co-axial helicopter.

For aerodynamic performance, the diamond shape of the ducts 25, 26, and 27 is based on varying the top and bottom cross sections of the diamond-shaped ducts 25, 26, and 27 to take advantage of the velocity and the pressure of airflow, according to Bernoulli's Principle. The layout of the diamond-shaped ducts 25, 26, and 27 provides more thrust, vertical lift, and forward horizontal speed. The Blended Wing Body (BWB) right and left Ogival Delta wings 13 and 14 are configured to provide most of the lift required and achieve a greater lift-to-drag (L/D) ratio, particularly during HTOL flight. The fuselage 1 of multi-mode UAV 100 features Ultra-lightweight monocoque structures providing higher structural efficiency and reliability. The combination of the Ogival Delta wings 13 and 14, the WIG-effect bottom 8, and the fuselage 1 results in providing high aerodynamic and hydrodynamic performance.

Stability of multi-mode UAV 100 is achieved by employing the dual set of counter-rotating rotors 28 mounted on dual brushless electric motors or fuel-powered motors 29 oriented to rotate in opposite directions. This causes the torque produced from each motor to cancel out and provide better gyroscopic stability, more power, and more propeller efficiency. In addition, the overall layout of the fuselage 1, the Blended Wing Body (BWB) Ogival Delta wings 13 and 14, and the WIG-effect bottom 9 provide a high degree of stability.

Controllability of multi-mode UAV 100 is maintained by varying and vectoring the thrust produced by all six brushless electric motors or fuel-powered motors 29, using the pivotal control surfaces 30, 33, and 36 at the top entrances of the diamond-shaped ducts 25, 26, and 27, respectively. Each set of pivotal control surfaces 30, 33, and 36 direct and re-direct the flow of air entering each diamond-shaped duct 25, 26, and 27, respectively. Controllability is provided by the integrated autonomous flight control system 3430, which will be described in more detail herein with reference to FIG. 34.

Figure 23A:
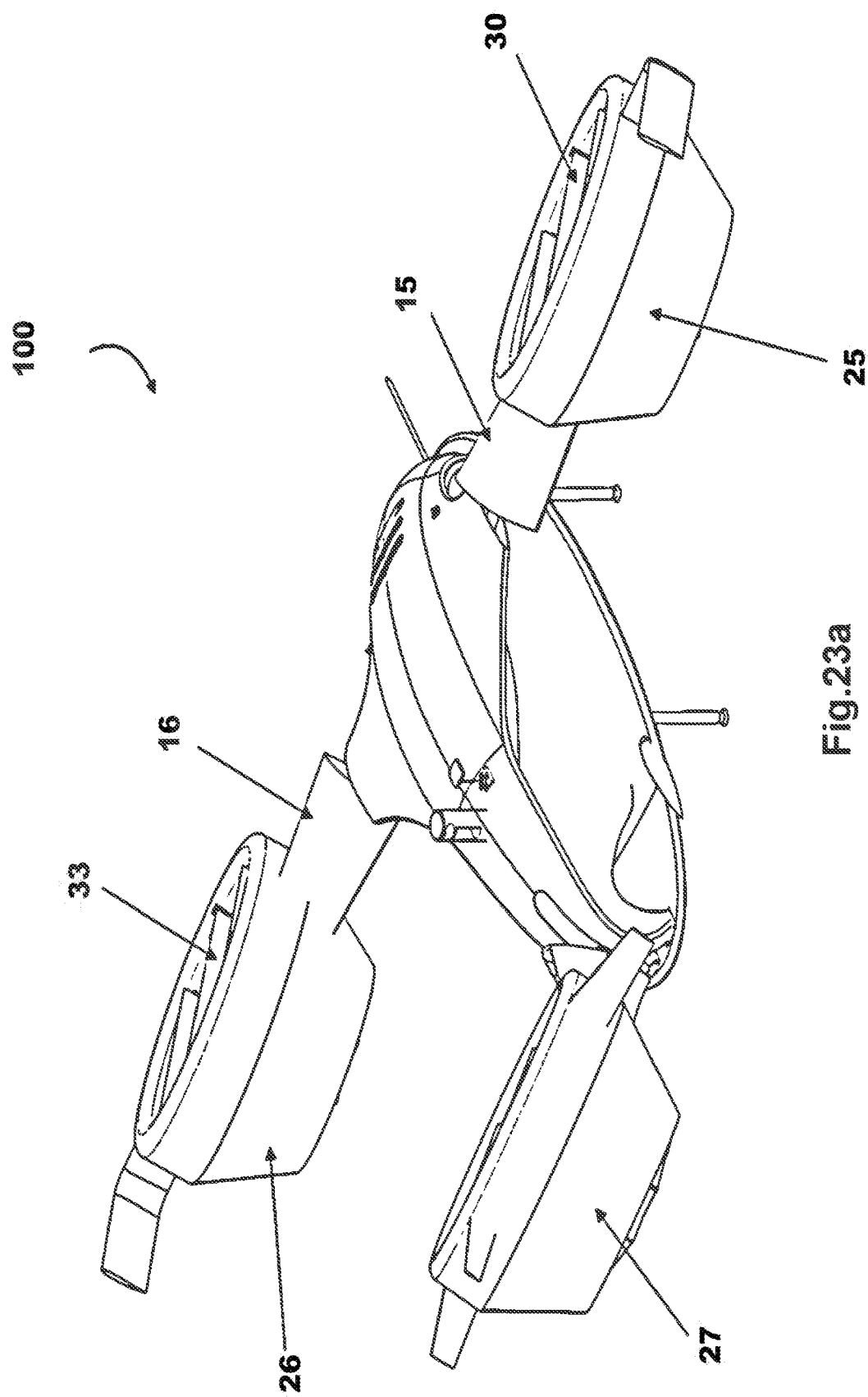
FIG. 23a illustrates a multi-mode UAV in a pitch mode according to one embodiment.

Pitch control can be accomplished by tilting the small tilt-wings 15 and 16 and the tilt tail 17 collectively as illustrated in FIG. 23a, which allows the diamond-shaped ducts 25, 26, and 27 to tilt to change in the direction of the air flow. Pitch control can also be accomplished by tilting collectively the small tilt-wings 15 and 16, the tilt tail 17, and the pivotal control surfaces 30, 33, and 36.

Figure 23C:
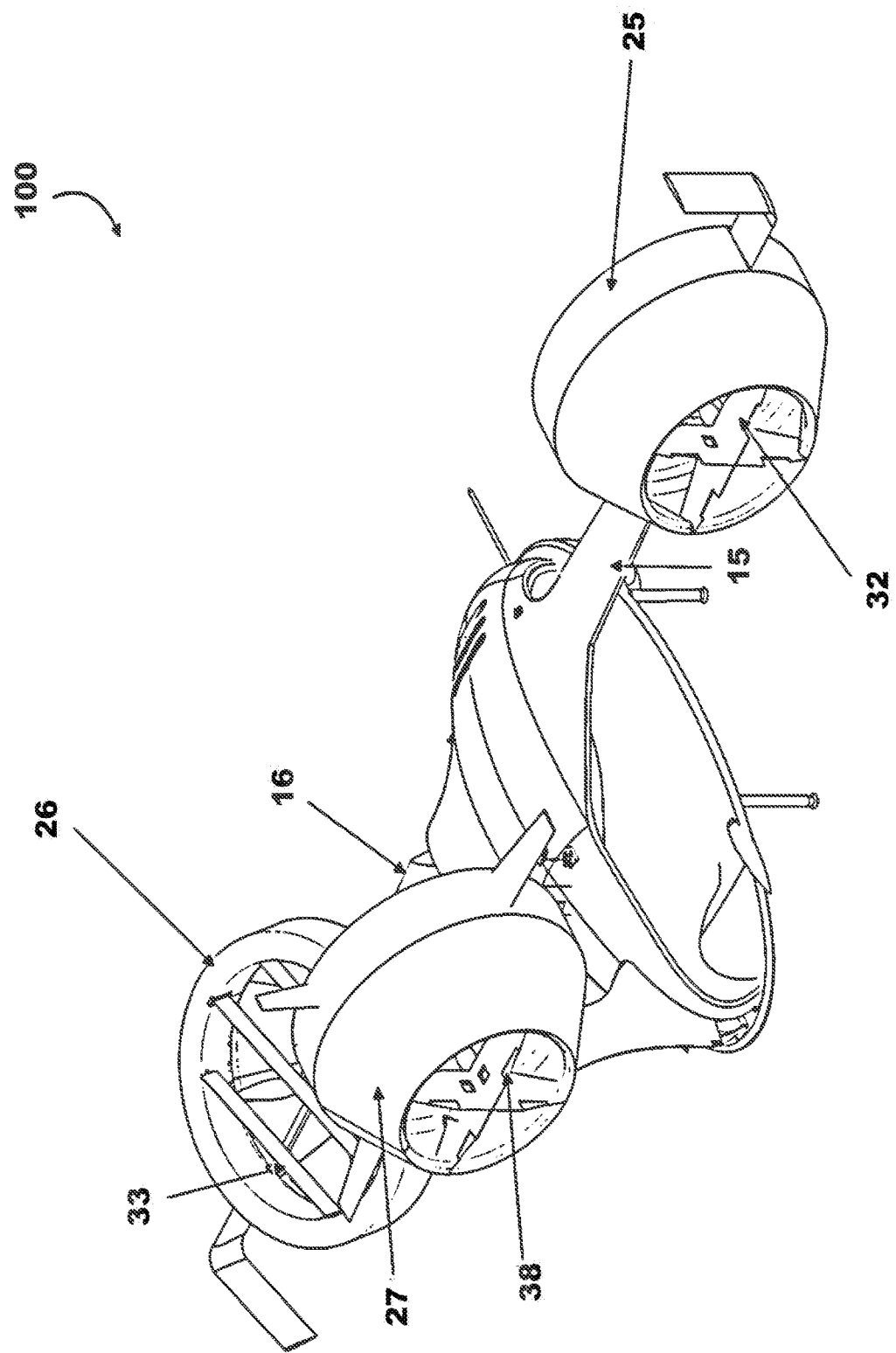
FIG. 23c illustrates a multi-mode UAV in a roll mode according to one embodiment.

Yaw and roll control can be accomplished by keeping one of the small tilt-wings 15 or 16 and the tilt tail 17 stationary, while tilting the other small tilt-wing 16 or 15 differentially as illustrated in FIGS. 23b and 23c. Yaw and roll control can also be accomplished by rotating the pivotal control surfaces 30 and 36 at the top entrance of the right front diamond-shaped duct 25 and the rear diamond-shaped duct 27, or by rotating the pivotal control surfaces 33 and 36 of the left front diamond-shaped duct 26 and the rear diamond-shaped duct 27 individually, while not rotating the pivotal control surfaces in the other front duct, to reduce deflected air flow around them.

Maneuverability of multi-mode UAV 100 can be maintained by using the integrated autonomous flight control system 3430 to control each set of pivotal control surfaces 30, 33, and 36 differentially to rectify the turbulent air flow, which reduces the swirl velocity. This ensures the air flow will vary from one diamond-shaped duct to another diamond-shaped duct.

Figure 8:
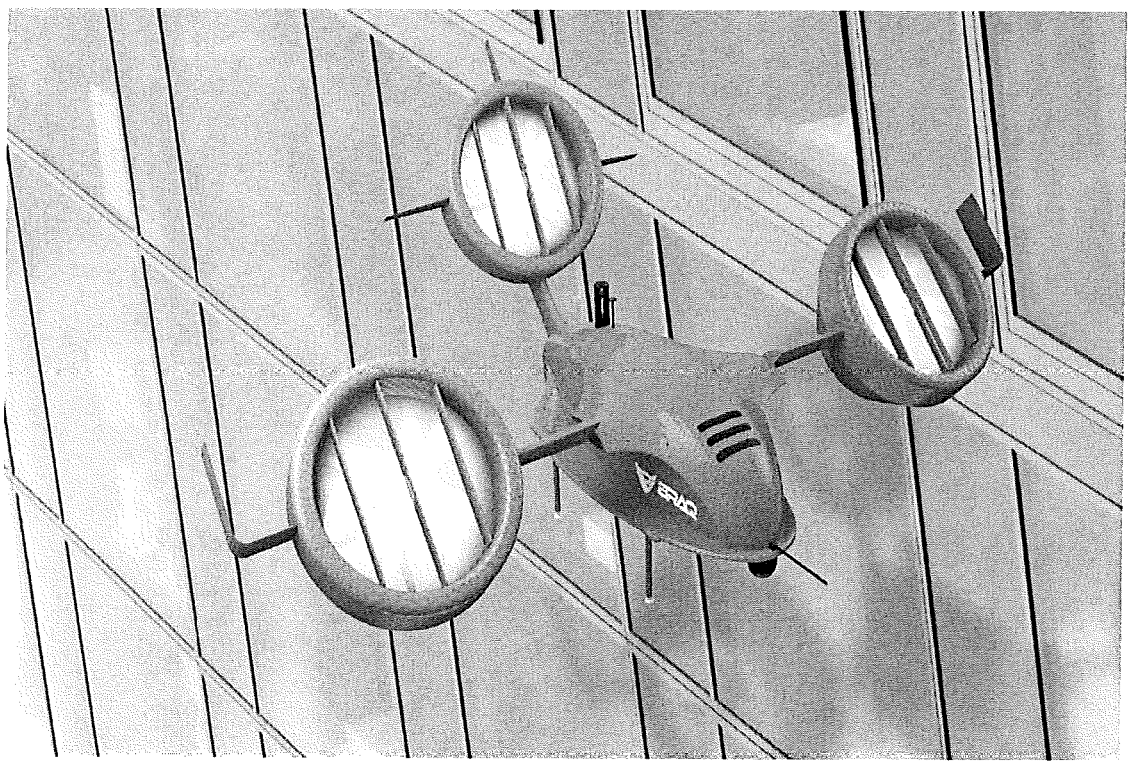
FIG. 8 is a front perspective view of a multi-mode UAV in a STOL mode according to one embodiment.
Figure 9:
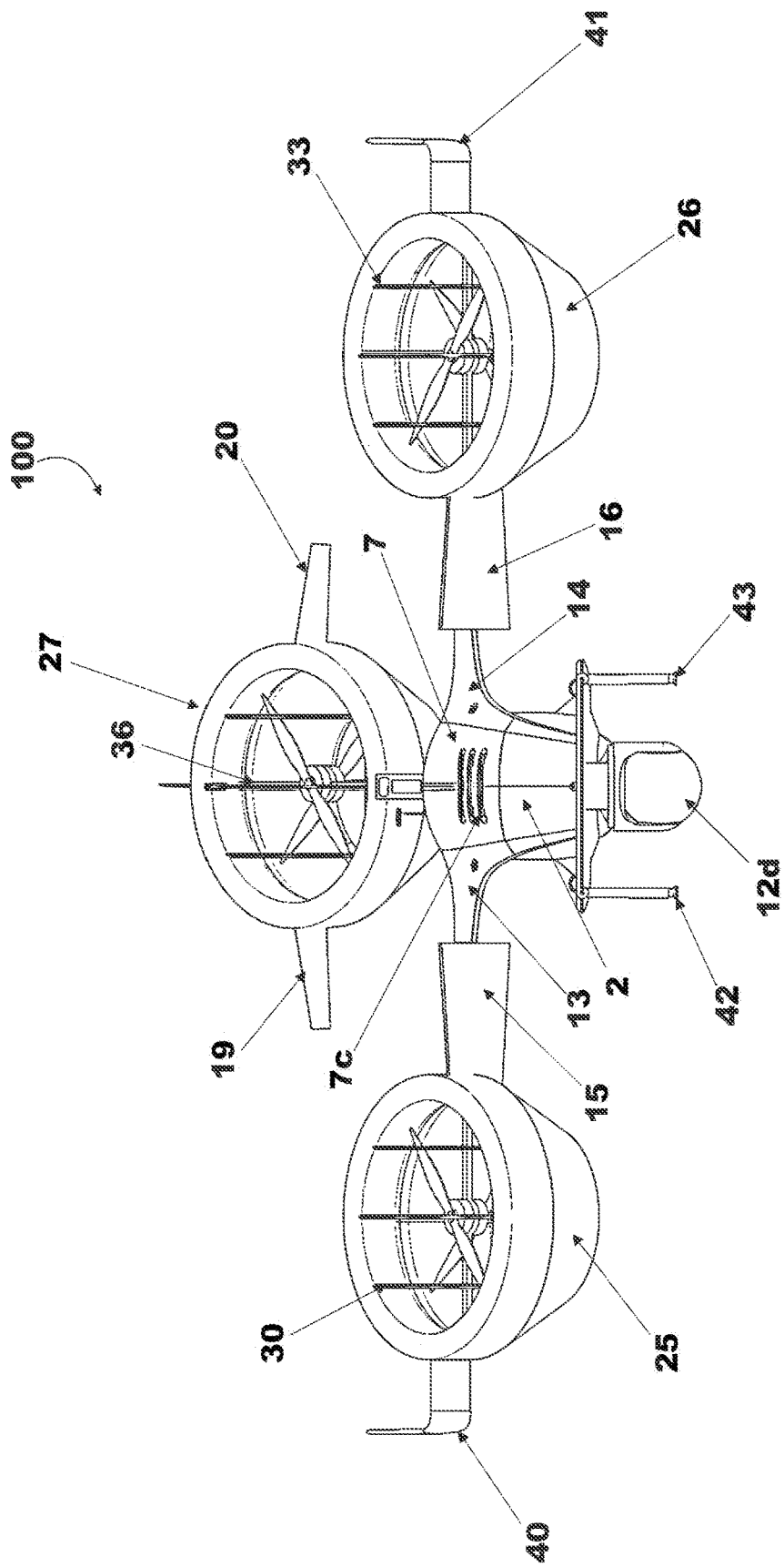
FIG. 9 is a front schematic view of a multi-mode UAV in a STOL mode according to one embodiment.
Figure 10:
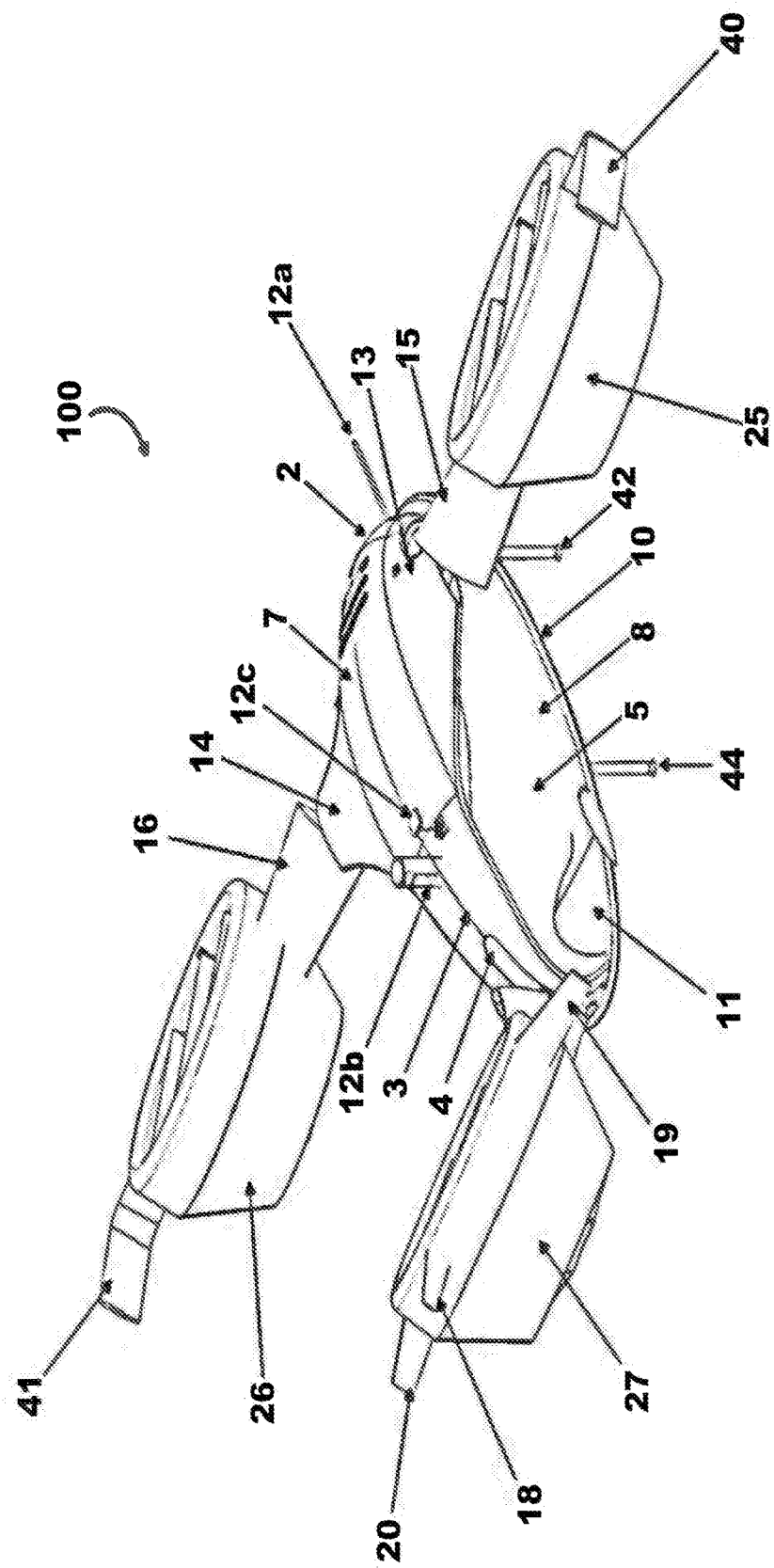
FIG. 10 is a rear perspective schematic view of a multi-mode UAV in a STOL mode according to one embodiment.
Figure 11:
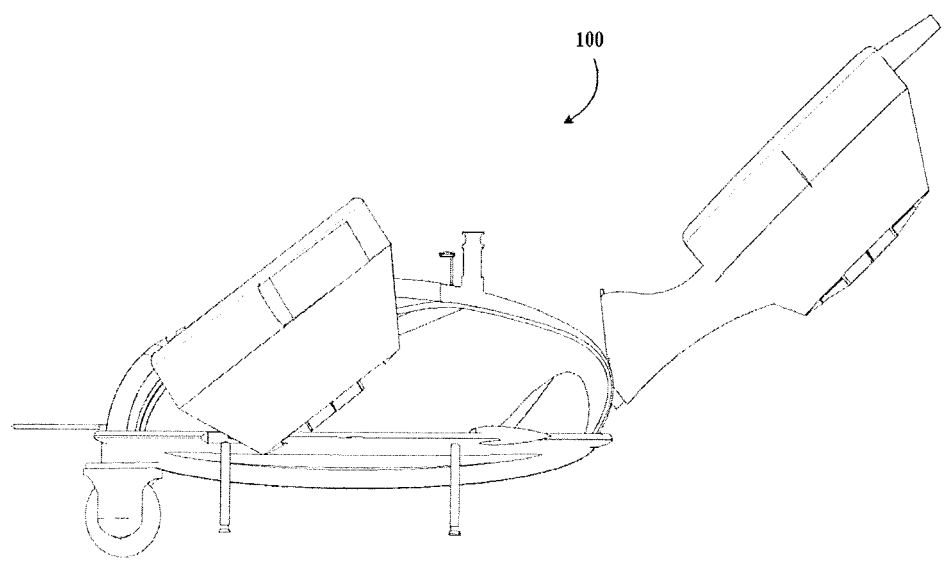
FIG. 11 is a left-side schematic view of a multi-mode UAV in a STOL mode according to one embodiment.
Figure 12:
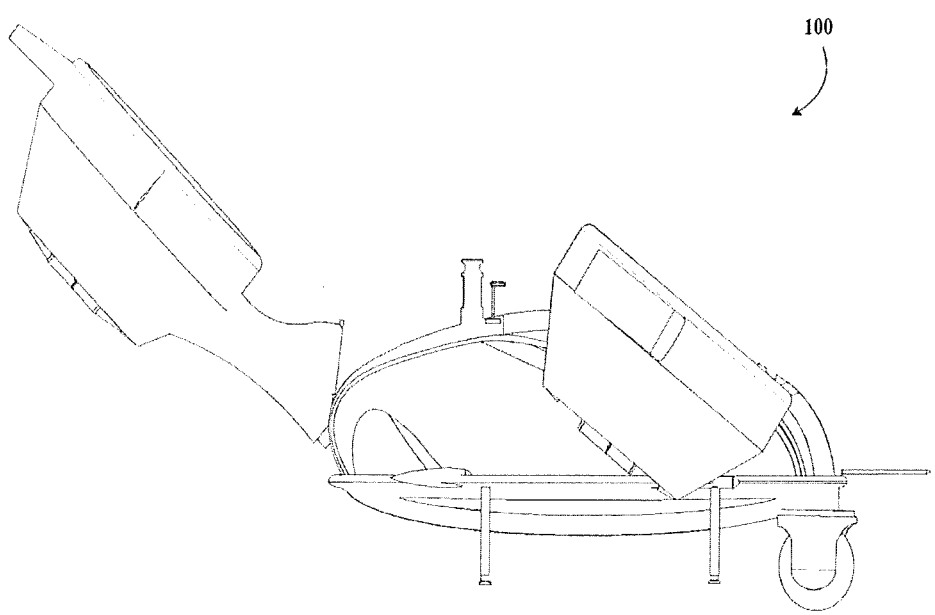
FIG. 12 is a right-side schematic view of a multi-mode UAV in a STOL mode according to one embodiment.
Figure 13:
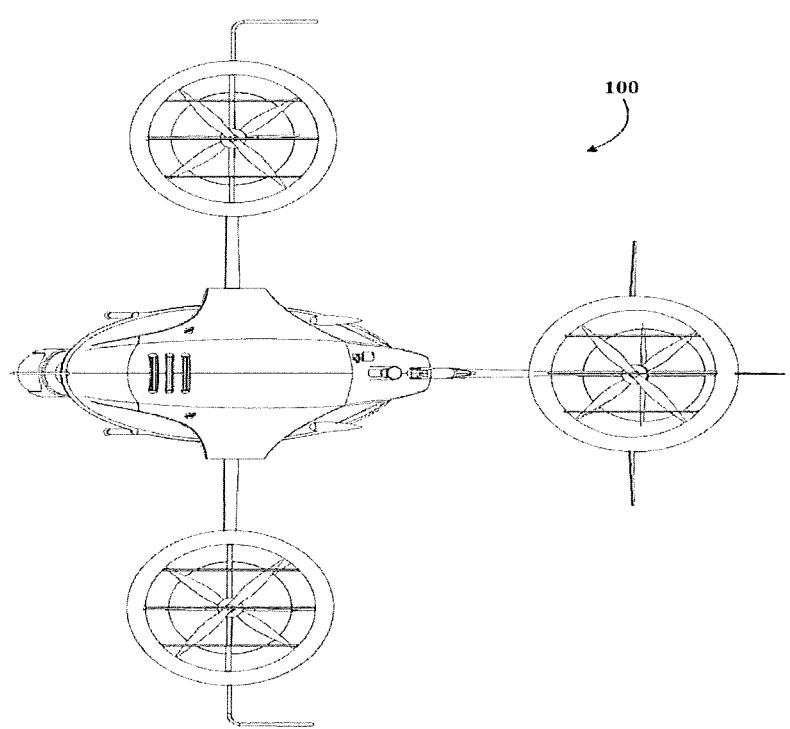
FIG. 13 is a top schematic view of a multi-mode UAV in a STOL mode according to one embodiment.
Figure 14:
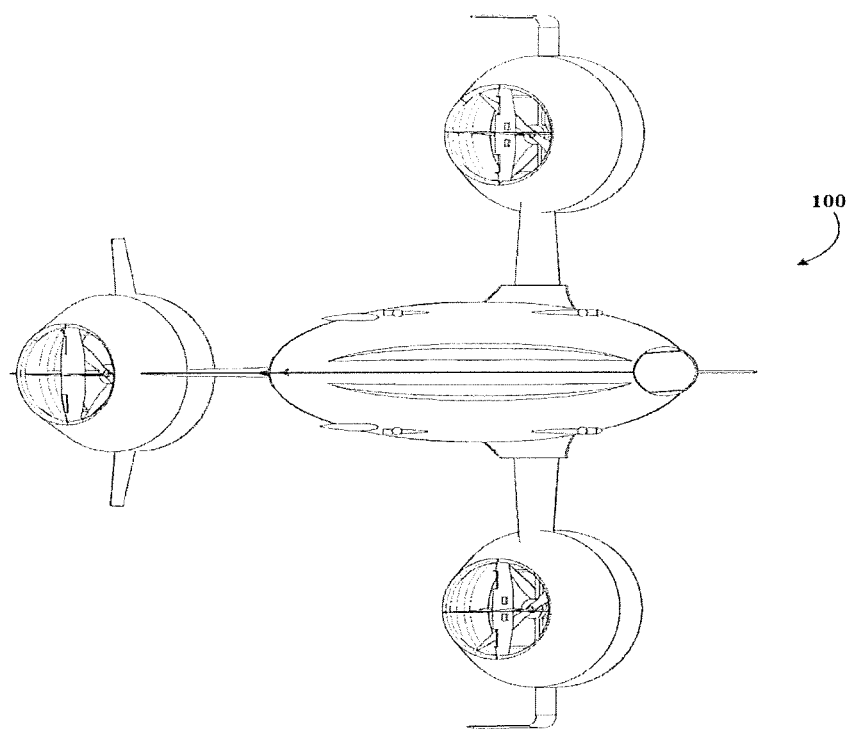
FIG. 14 is a bottom schematic view of a multi-mode UAV in a STOL mode according to one embodiment.

FIG. 8 is a perspective view of an exemplary multi-mode UAV in a STOL mode. FIGS. 9-14 are schematic views of an exemplary multi-mode UAV 100 in a STOL mode according to embodiments described herein. Only some of the reference numbers are illustrated in some of the figures. FIG. 9 is a front view of multi-mode UAV 100. FIG. 10 is a rear perspective view of multi-mode UAV 100. FIG. 11 is a left-side view of multi-mode UAV 100. FIG. 12 is a right-side view of multi-mode UAV 100. FIG. 13 is a top view of multi-mode UAV 100. FIG. 14 is a bottom view of multi-mode UAV 100.

As illustrated, each of the right diamond-shaped duct 25, the left diamond-shaped duct 26, and the rear diamond-shaped duct 27 are rotated slightly upwards from the horizontal position, relative to the plane of the elongated fuselage 1. In one embodiment, each of the diamond-shaped ducts 25, 26, and 27 are rotated upwards from a horizontal plane 30-45 degrees. However, other angles of rotation are contemplated by embodiments described herein, and will depend upon the pre-determined travel route and conditions. This provides a thrust in both the vertical and horizontal positions from each of the diamond-shaped ducts 25, 26, and 27.

Figure 15:
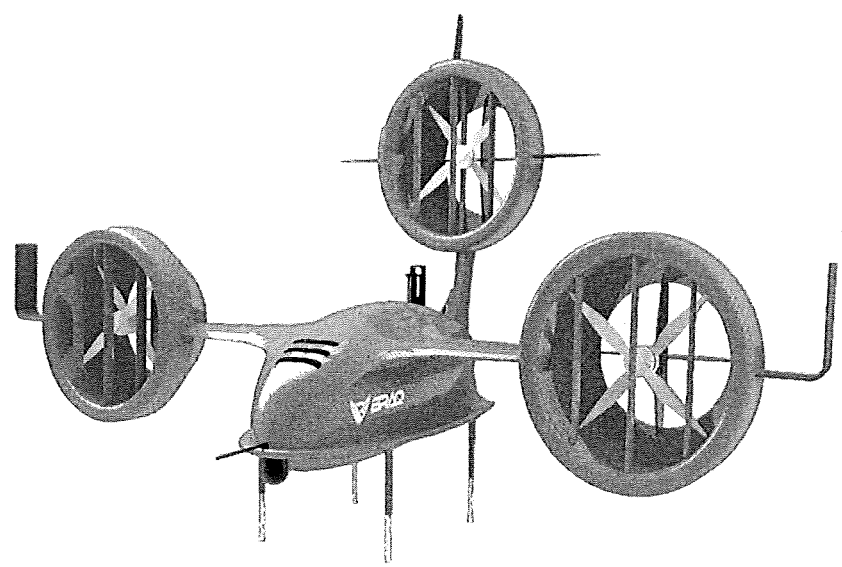
FIG. 15 is a front perspective view of a multi-mode UAV in a horizontal take-off and landing (HTOL) mode according to one embodiment.
Figure 16:
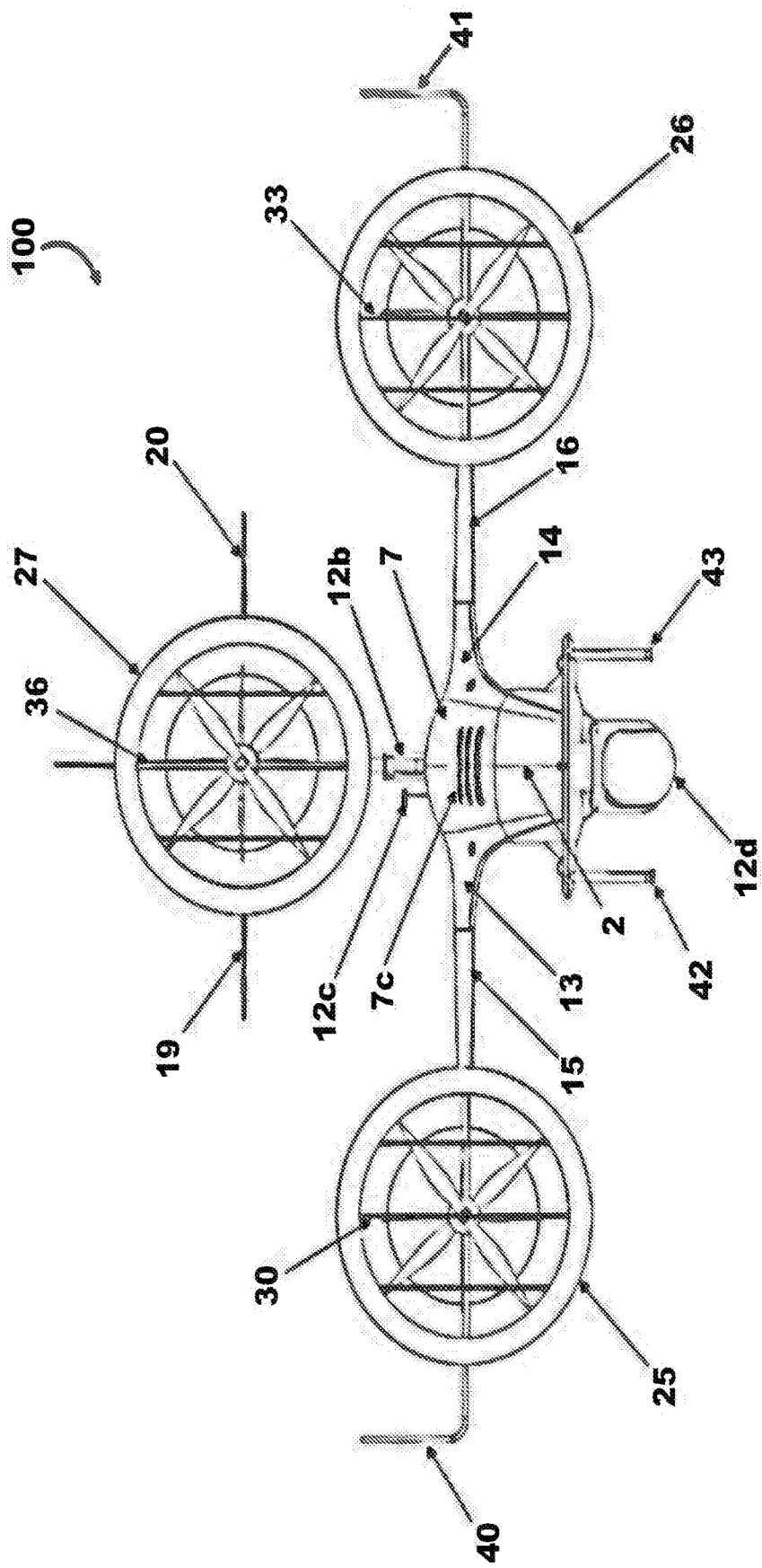
FIG. 16 is a front schematic view of a multi-mode UAV in a HTOL mode according to one embodiment.
Figure 17:
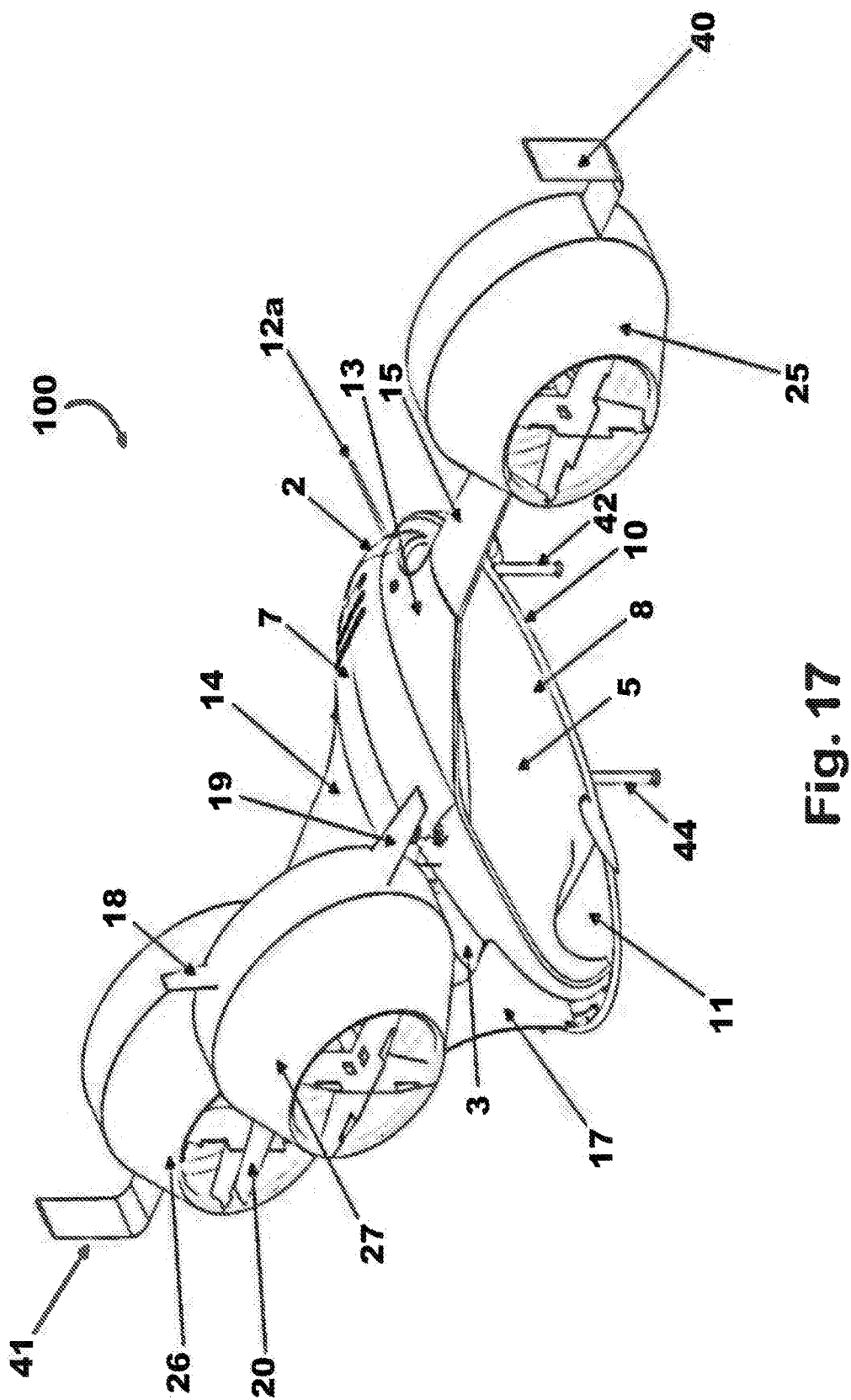
FIG. 17 is a rear perspective schematic view of a multi-mode UAV in a HTOL mode according to one embodiment.
Figure 18:
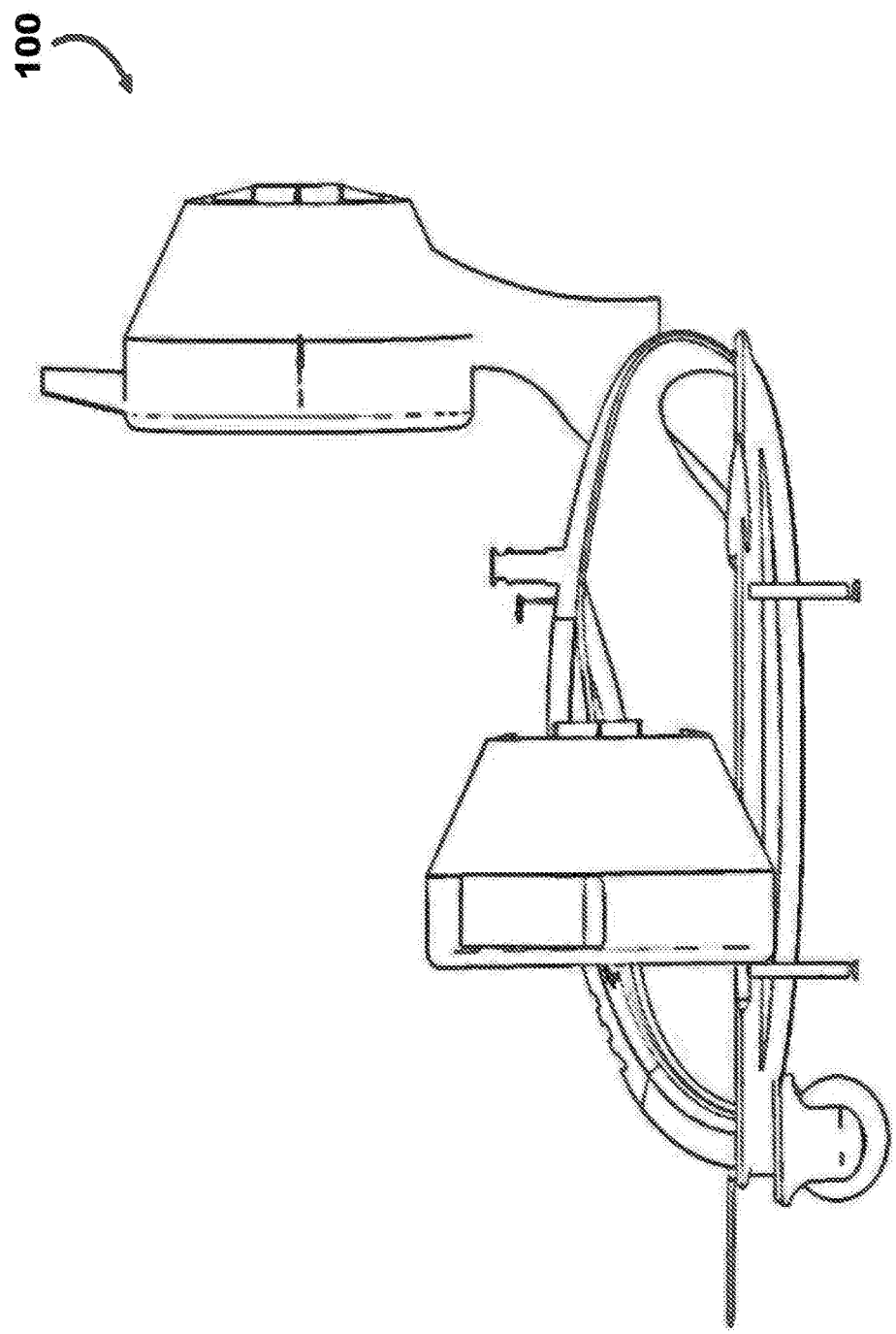
FIG. 18 is a left-side schematic view of a multi-mode UAV in a HTOL mode according to one embodiment.
Figure 19:
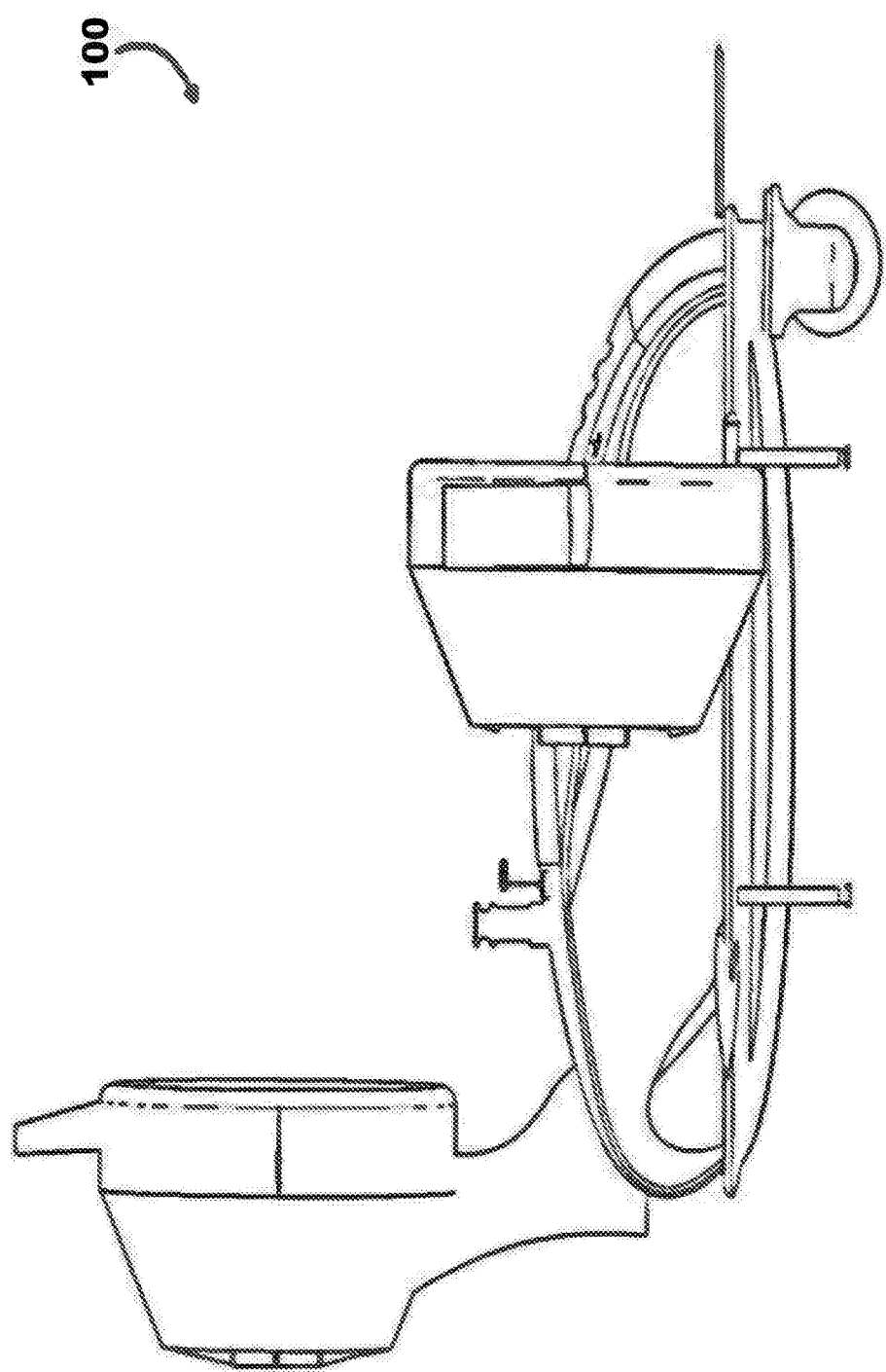
FIG. 19 is a right-side schematic view of a multi-mode UAV in a HTOL mode according to one embodiment.
Figure 20:
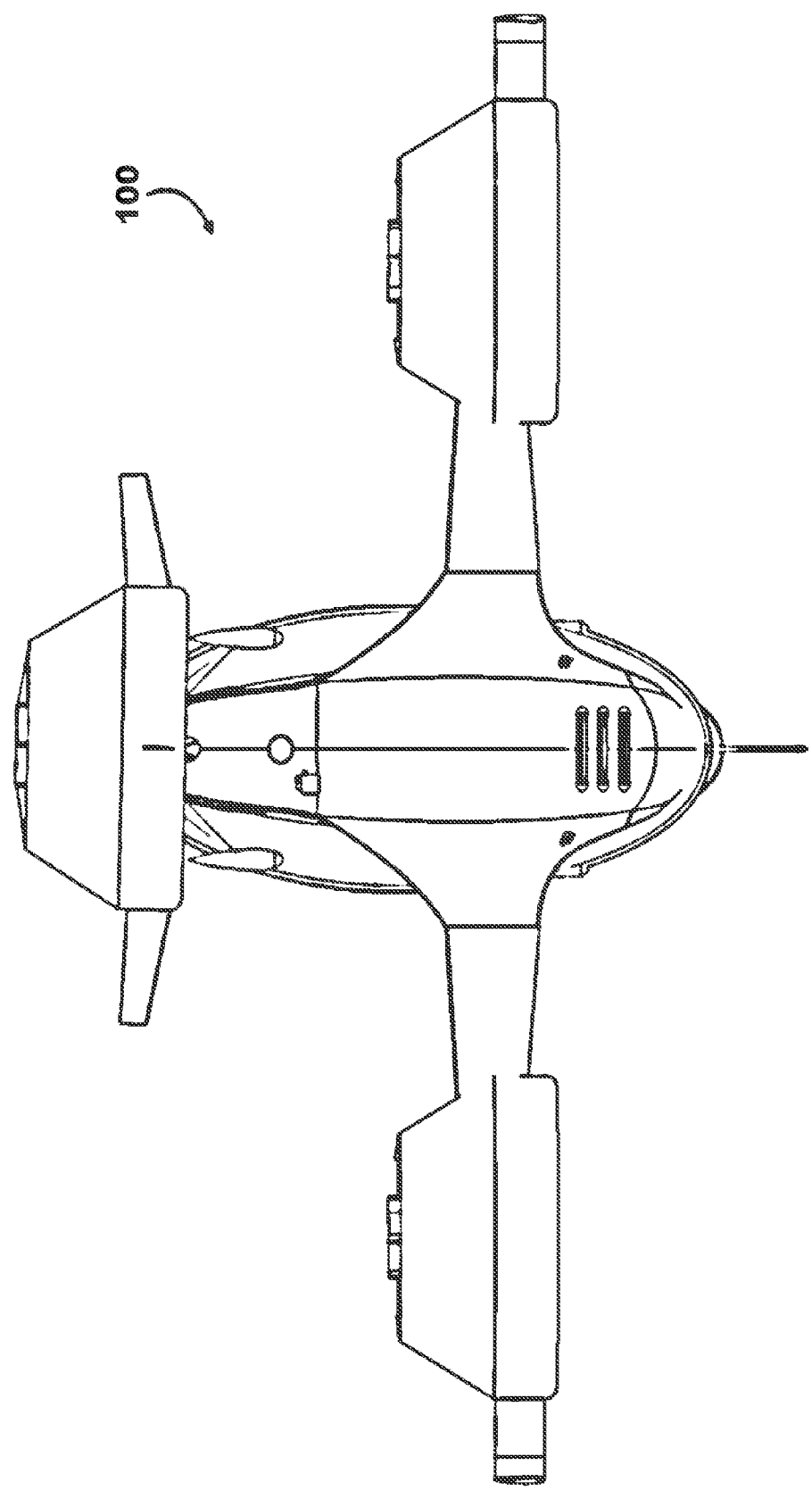
FIG. 20 is a top schematic view of a multi-mode UAV in a HTOL mode according to one embodiment.
Figure 21:
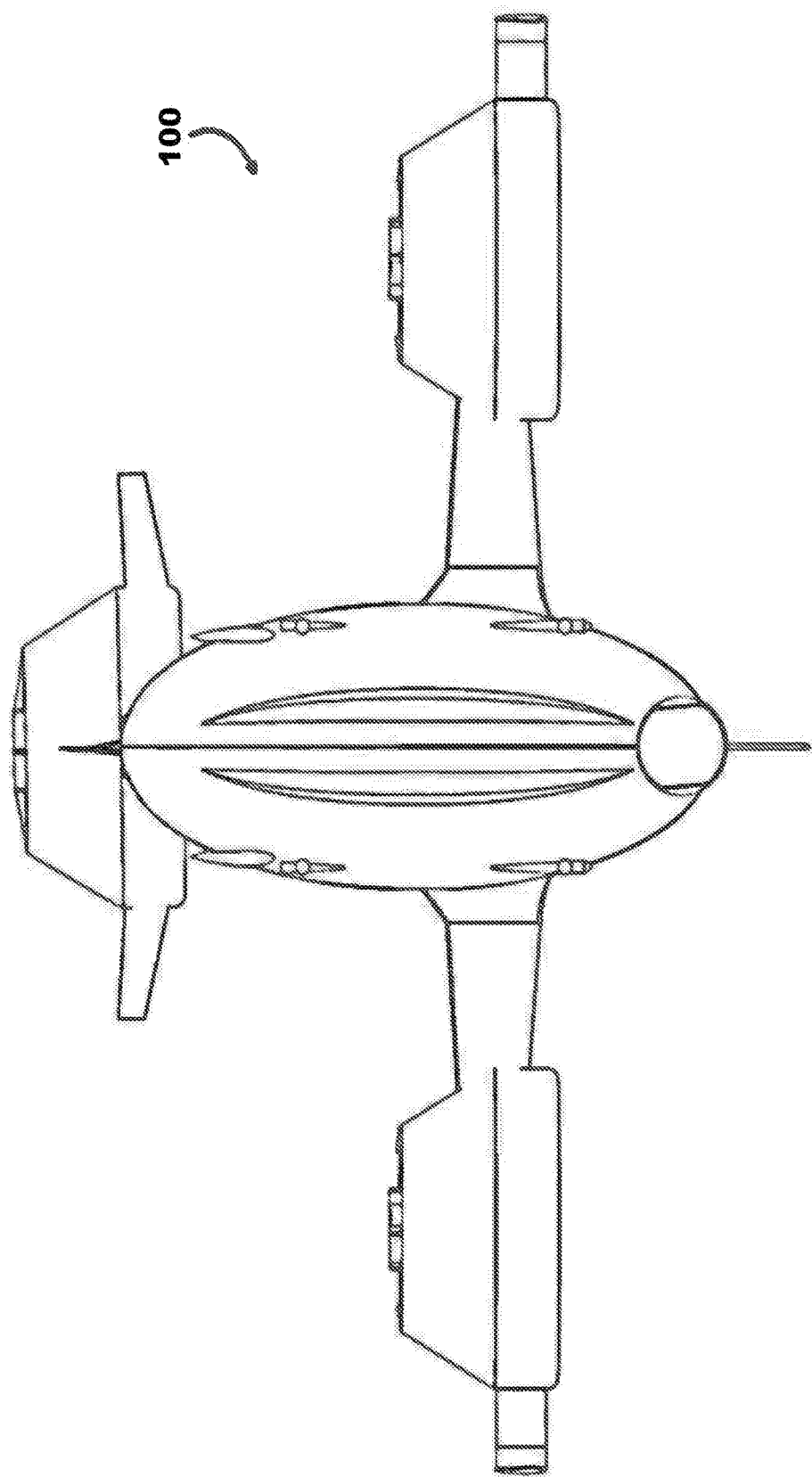
FIG. 21 is a bottom schematic view of a multi-mode UAV in a HTOL mode according to one embodiment.

FIG. 15 is a perspective view of an exemplary multi-mode UAV in a HTOL mode. FIGS. 16-21 are schematic views of an exemplary multi-mode UAV 100 in a HTOL mode according to embodiments described herein. Only some of the reference numbers are illustrated in some of the figures. FIG. 16 is a front view of multi-mode UAV 100. FIG. 17 is a rear perspective view of multi-mode UAV 100. FIG. 18 is a left-side view of multi-mode UAV 100. FIG. 19 is a right-side view of multi-mode UAV 100. FIG. 20 is a top view of multi-mode UAV 100. FIG. 21 is a bottom view of multi-mode UAV 100.

As illustrated in FIGS. 15-21, each of the right diamond-shaped duct 25, the left diamond-shaped duct 26, and the rear diamond-shaped duct 27 are rotated upwards from a horizontal plane at or near to ninety degrees in a HTOL mode. This provides a complete or nearly complete thrust in the horizontal direction from each of the diamond-shaped ducts 25, 26, and 27.

FIG. 22a is a schematic side view of multi-mode UAV 100 with each of the right diamond-shaped duct 25, the left diamond-shaped duct 26, and the rear diamond-shaped duct 27 oriented at zero degrees, relative to the lateral axis of the elongated fuselage, in a HTOL mode. This provides a complete or nearly complete thrust in the horizontal direction from each of the diamond-shaped ducts 25, 26, and 27.

Figure 22B:
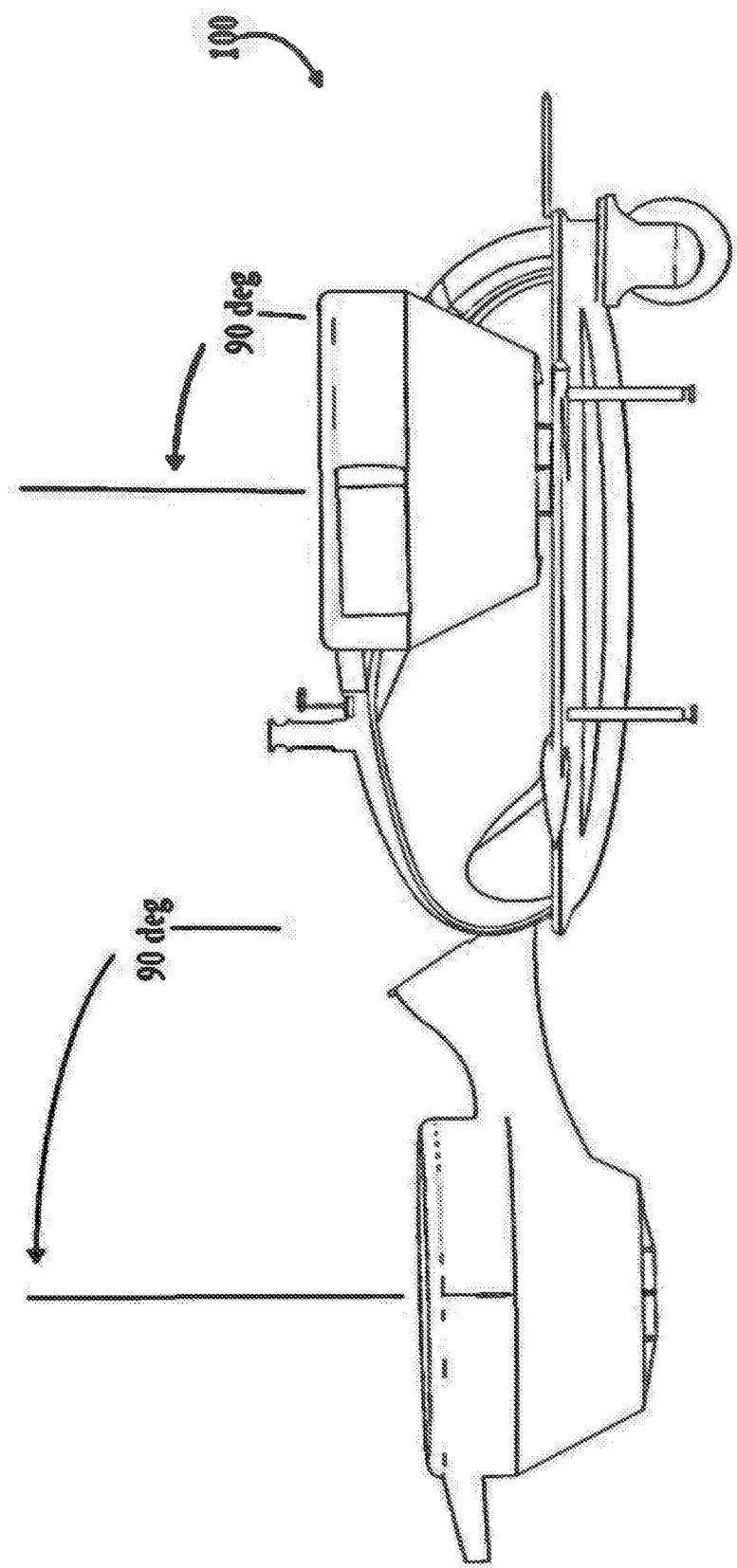
FIG. 22b is a side schematic view of a multi-mode UAV in a VTOL mode according to one embodiment.

FIG. 22b is a schematic side view of multi-mode UAV 100 with each of the diamond-shaped ducts 25, 26, and 27 oriented in a vertical ninety-degree position, relative to the lateral axis of the elongated fuselage in a VTOL mode. This provides a complete or nearly complete thrust in the vertical direction from each of the diamond-shaped ducts 25, 26, and 27. When multi-mode UAV 100 transitions from a HTOL mode to a VTOL mode and the diamond-shaped ducts 25, 26, and 27 are rotated ninety degrees backward, multi-mode UAV 100 is slowed to a complete stop of a forward motion and into a hovering mode.

FIG. 22c is a schematic side view of multi-mode UAV 100 with each of the diamond-shaped ducts 25, 26, and 27 oriented at or near a 30-45 degree position, relative to the lateral axis of the elongated fuselage in a STOL mode. The STOL mode is considered to be an air-breaking mode when multi-mode UAV 100 transitions from a HTOL mode to a VTOL in which the diamond-shaped ducts 25, 26, and 27 are rotated backward to a 30-45 degree position, which slows a forward motion of UAV 100. This decreases the air speed when air flow hits the tilt-wing surfaces. When multi-mode UAV 100 transitions from a VTOL mode to a HTOL mode, the diamond-shaped ducts 25, 26, and 27 are rotated upward to the 30-45 degree position, and the vertical thrust is increased while in the STOL mode.

Figure 24:
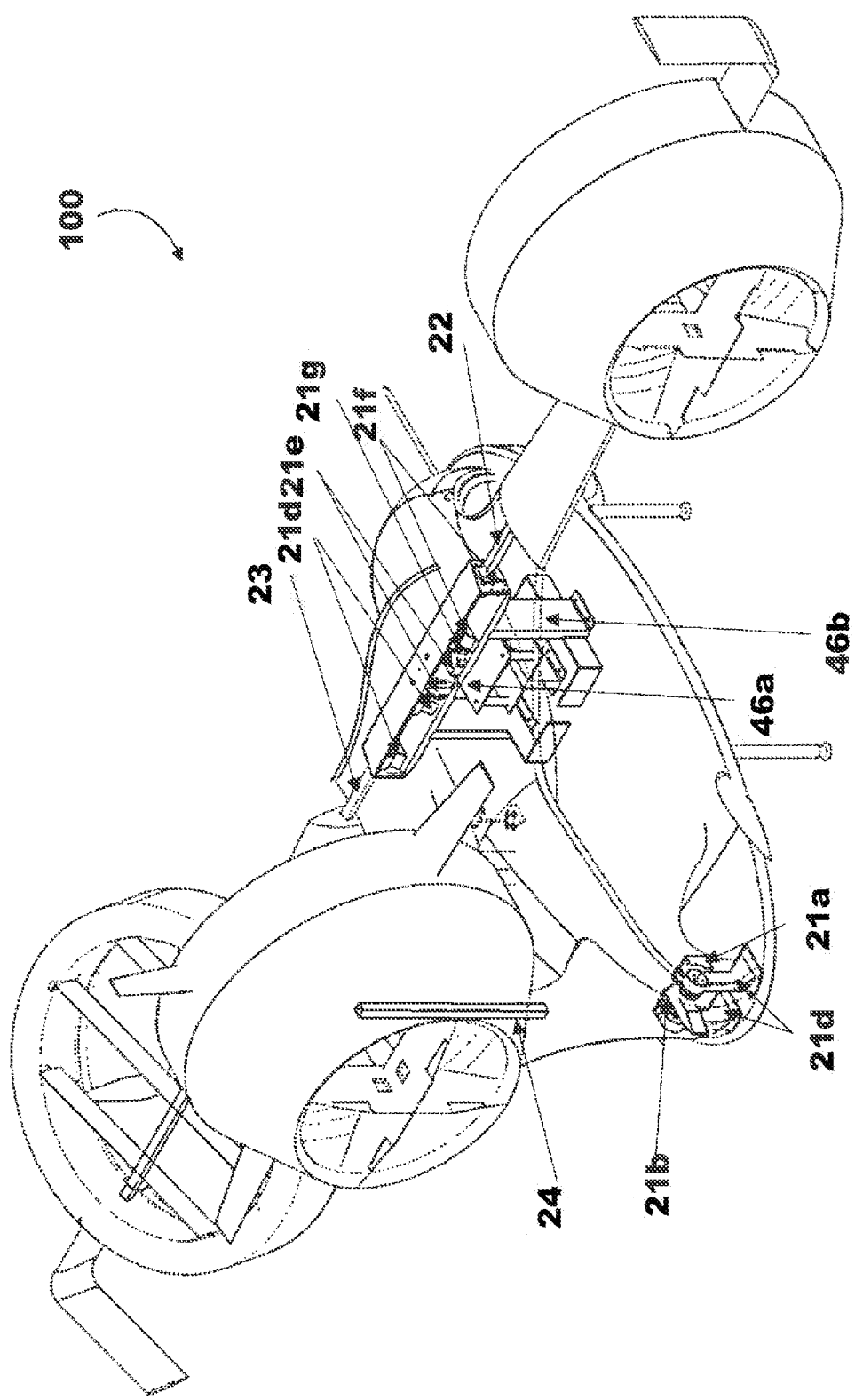
FIG. 24 is a front perspective schematic view illustrating a front tilting mechanism according to one embodiment.

FIG. 24 is a schematic rear perspective view, illustrating a tilting mechanism. The outline of UAV 100 is illustrated with dashed lines to indicate the noted features are located out of view from the external surface of UAV 100.

The tilting mechanism includes two digital fly-by-wire servo actuators 21a, mounted on the leveled base 46a and centered in the middle of the elongated fuselage 1. The digital fly-by-wire servo actuators 21a are connected via a bevel gear group 21b to a right horizontally-oriented shaft 22 and a left horizontally-oriented shaft 23. These two horizontally oriented shafts have frictionless pulleys 21c (illustrated in FIG. 25) positioned inside circular supports 21d that are connected to the lateral frame structure of the leveled base 46a.

The tilting mechanism also includes two rear digital fly-by-wire servo actuators 21e mounted within rear circular supports 21f. The rear circular supports 21f are connected to the lateral frame structure of the rear end of the elongated fuselage 1, via a bevel gear group 21g to a vertically-oriented rear shaft 24.

Figure 28:
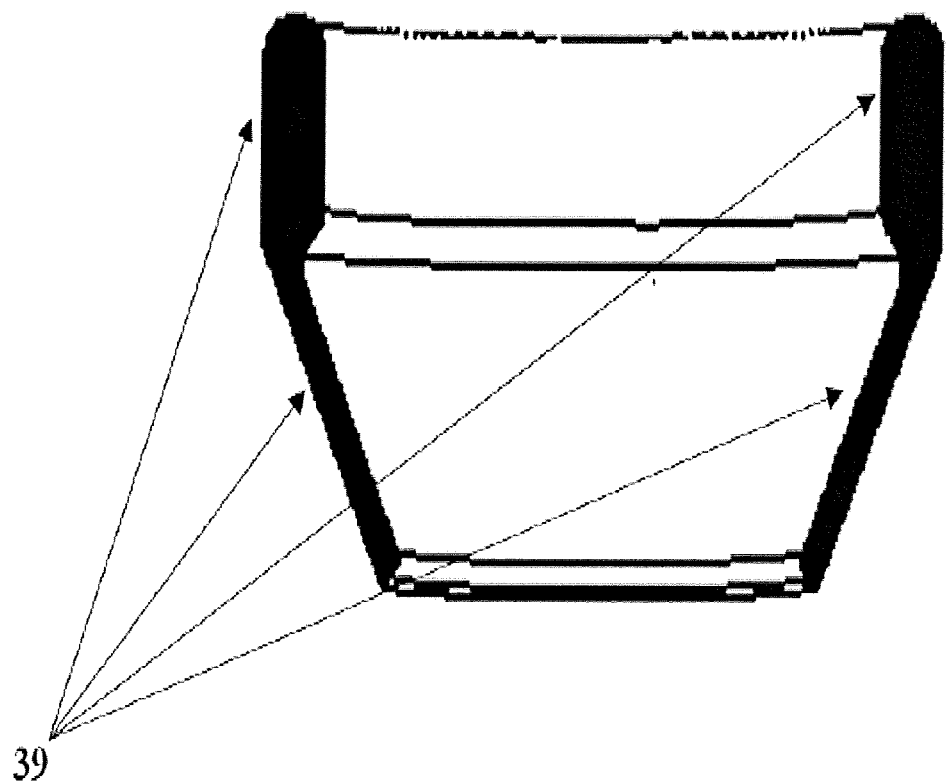
FIG. 28 illustrates a noise-blocking and insulation material according to one embodiment.

FIG. 28 illustrates a noise-blocking and insulation material 39, which is integrated within the duct walls of the right diamond-shaped duct 25, the left diamond-shaped duct 26, and the rear diamond-shaped duct 27. This provides an optimization of reduced noise levels while operating inside urban environments.

Figure 29:
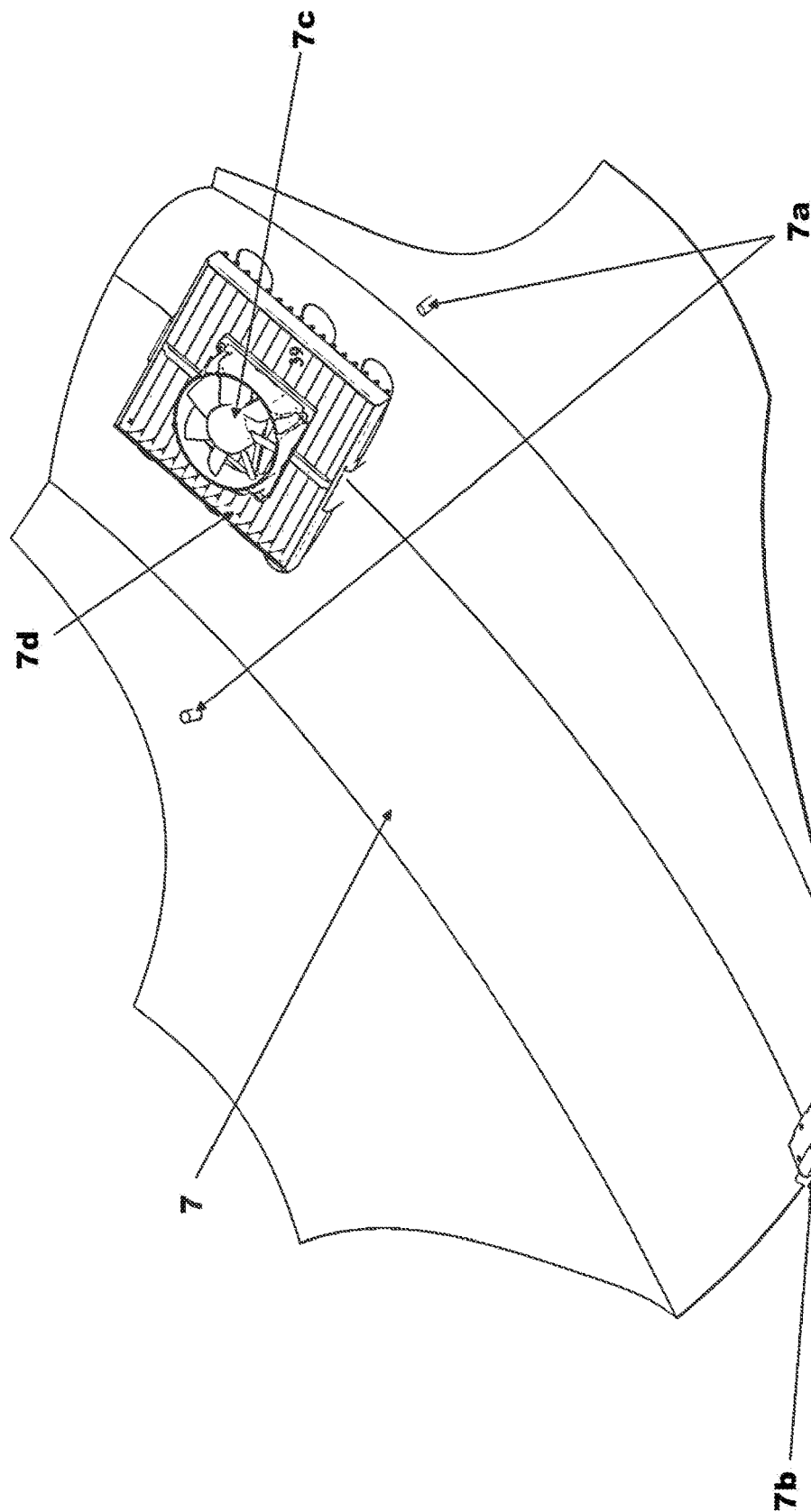
FIG. 29 illustrates a perspective view of a front container hinged door assembly according to one embodiment.

FIG. 29 illustrates a perspective view of a front container hinged-door assembly 7, which has two locking pins 7a to secure the hinged-door assembly in place. A hinge 7b links the end of the lateral frame structure of hinged-door assembly 7 to the lateral frame structure of the top end of the elongated fuselage 1. A cooling fan 7c allows air to cool down the digital fly-by-wire servo actuators 21a of the tilting mechanism and the components of integrated autonomous flight control system 3430. An air inlet with a filter 7d is located above the cooling fan 7c.

Figure 30:
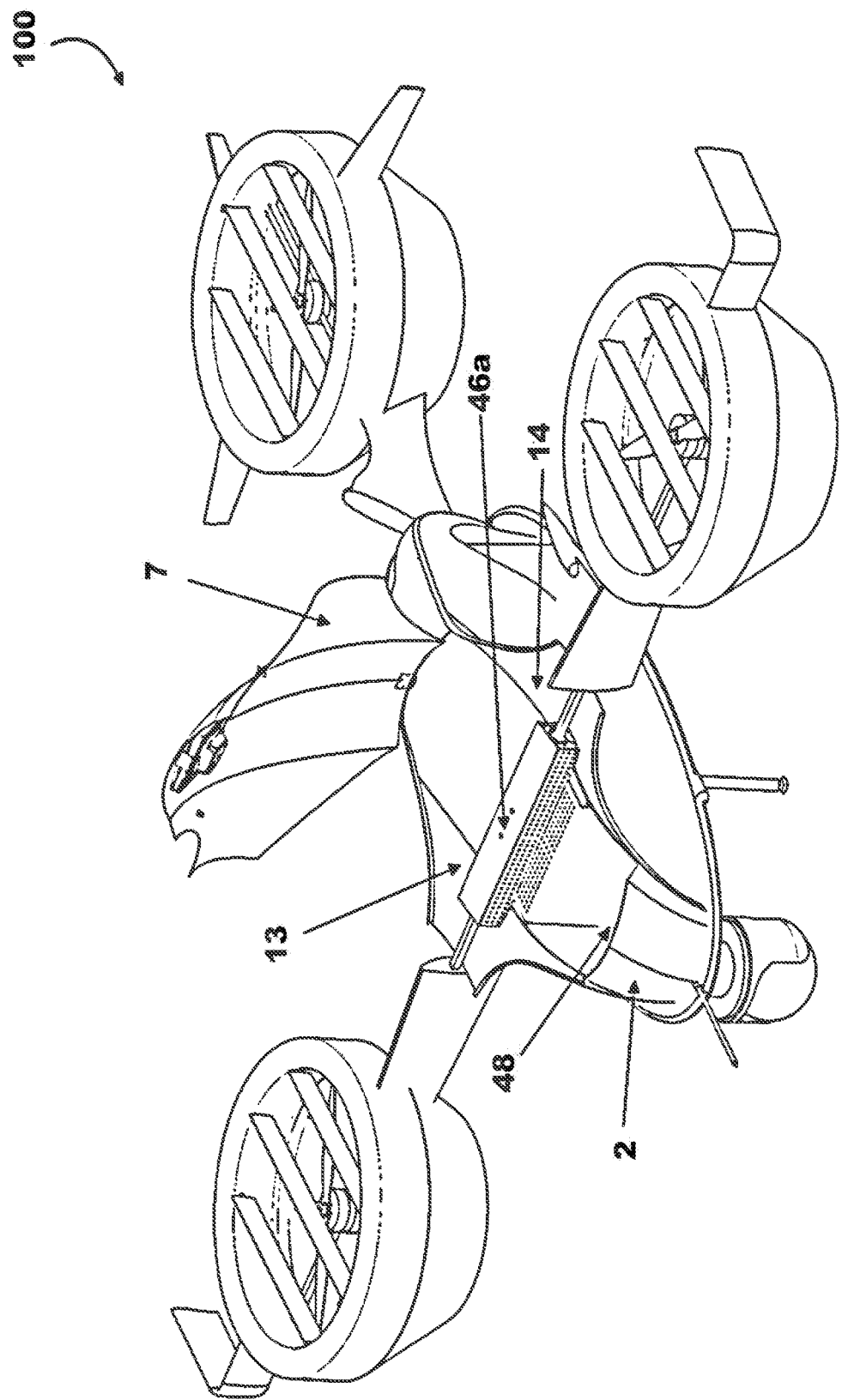
FIG. 30 illustrates a front perspective schematic view of a UAV with an opened front hinged-door container according to one embodiment.

FIG. 30 illustrates a perspective view of multi-mode UAV 100 and the front container hinged-door assembly 7 when opened. FIG. 30 also illustrates a front end 2, a leveled base 46a, a front storage container 48, a right Ogival Delta wing 13, and a left Ogival Delta wing 14.

Figure 31:
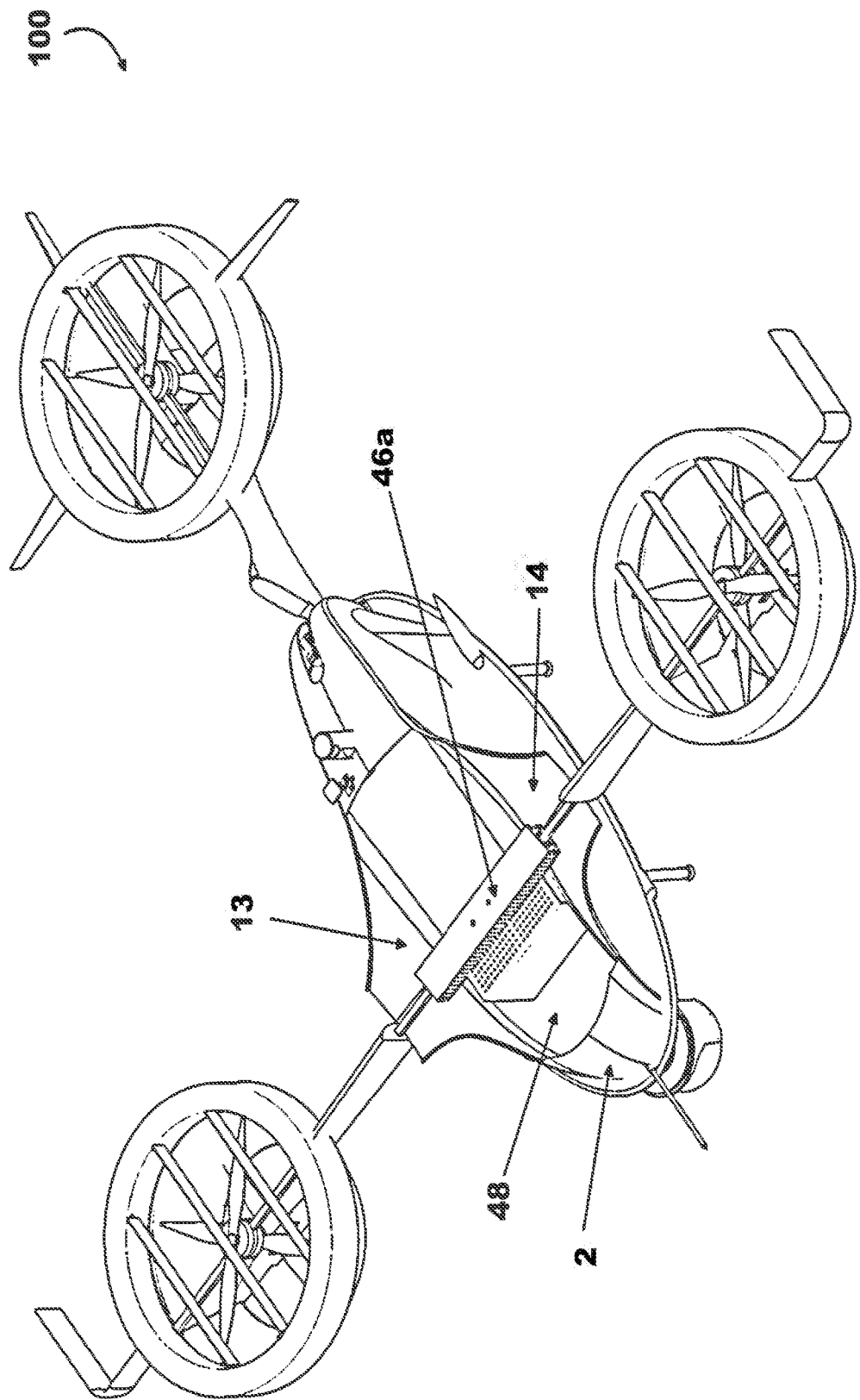
FIG. 31 illustrates a front perspective schematic view of a UAV without a front container according to one embodiment.

FIG. 31 illustrates a perspective view of multi-mode UAV 100 without the front container hinged-door assembly 7. FIG. 31 also illustrates a front end 2, a leveled base 46a, a front storage container 48, a right Ogival Delta wing 13, and a left Ogival Delta wing 14.

Figure 32:
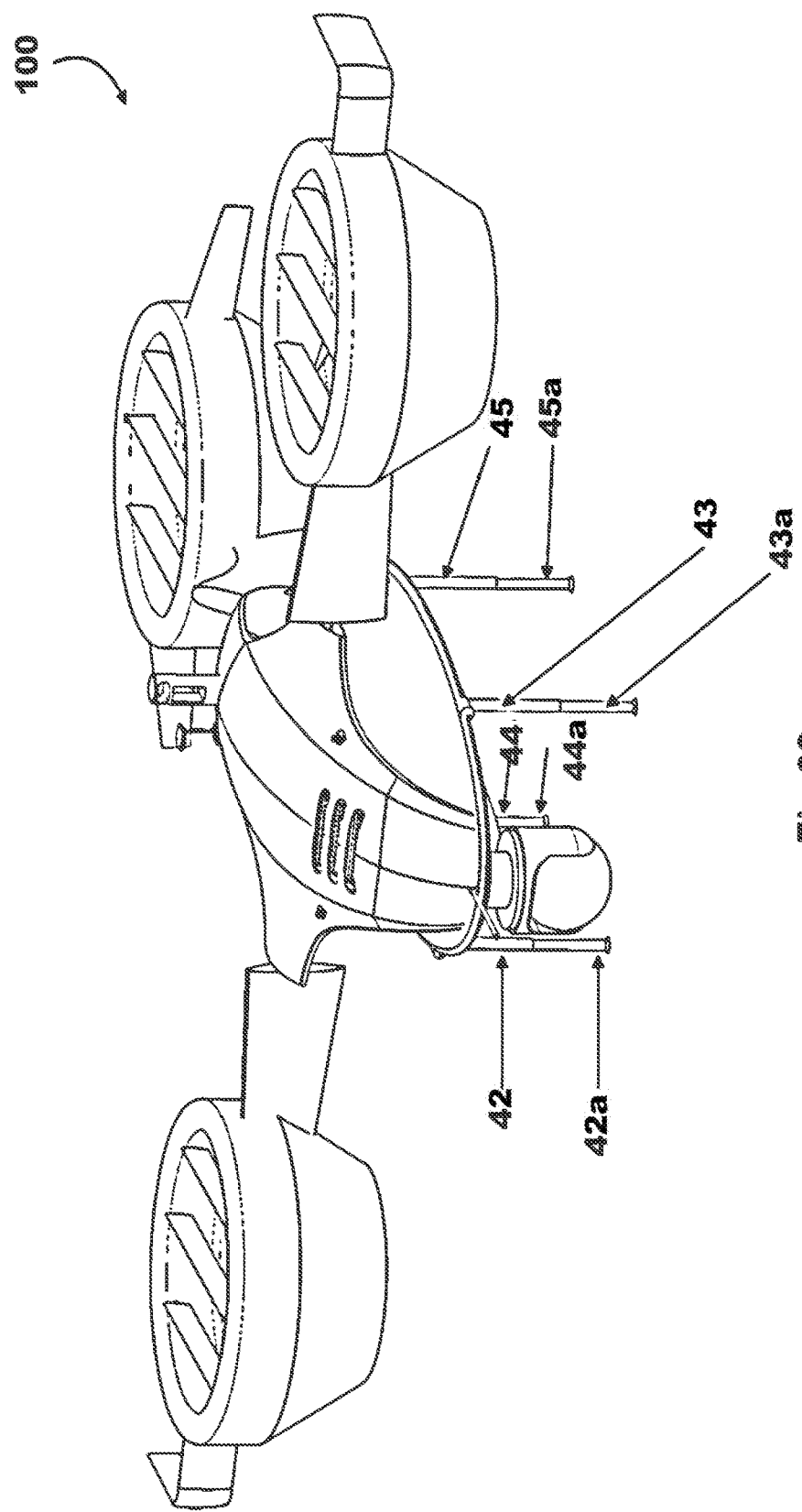
FIG. 32 illustrates a front perspective schematic view of landing gear structures according to one embodiment.

FIG. 32 illustrates a right front adjustable and slidable landing gear outer leg member 42. A right front inner leg member 42a coarsely slides and extends from the right front adjustable and slidable landing gear outer leg member 42. The right front inner leg member 42a has a loading force-sensitive contact sensor located at a lower end of the right front inner leg member 42a. The right front loading force-sensitive contact sensor is configured to detect terrain as multi-mode UAV 100 descends, which is interpreted in real-time by the integrated autonomous flight control system 3430. The right front inner leg member 42a also has a small rubber foot located over the right front loading force-sensitive contact sensor and the lower end of the right front inner leg member 42a.

FIG. 32 also illustrates a left front adjustable and slidable landing gear outer leg member 43. A left front inner leg member 43a coarsely slides and extends from the left front adjustable and slidable landing gear outer leg member 43. The left front inner leg member 43a has a loading force-sensitive contact sensor located at a lower end of the left front inner leg member 43a. The left front inner leg member 43a also has a small rubber foot located over the left front loading force-sensitive contact sensor and the lower end of the left front inner leg member 43a.

FIG. 32 also illustrates a right rear adjustable and slidable landing gear outer leg member 44. A right rear inner leg member 44a coarsely slides and extends from the right rear adjustable and slidable landing gear outer leg member 44. The right rear inner leg member 44a has a loading force-sensitive contact sensor located at a lower end of the right rear inner leg member 44a. The right rear inner leg member 44a also has a small rubber foot located over the right rear loading force-sensitive contact sensor and the lower end of the right rear inner leg member 44a.

FIG. 32 also illustrates a left rear adjustable and slidable landing gear outer leg member 45. A left rear inner leg member 45a coarsely slides and extends from the left rear adjustable and slidable landing gear outer leg member 45. The left rear inner leg member 45a has a loading force-sensitive contact sensor located at a lower end of the left rear inner leg member 45a. The left rear inner leg member 45a also has a small rubber foot located over the left rear loading force-sensitive contact sensor and the lower end of the left rear inner leg member 45a.

Figure 33:
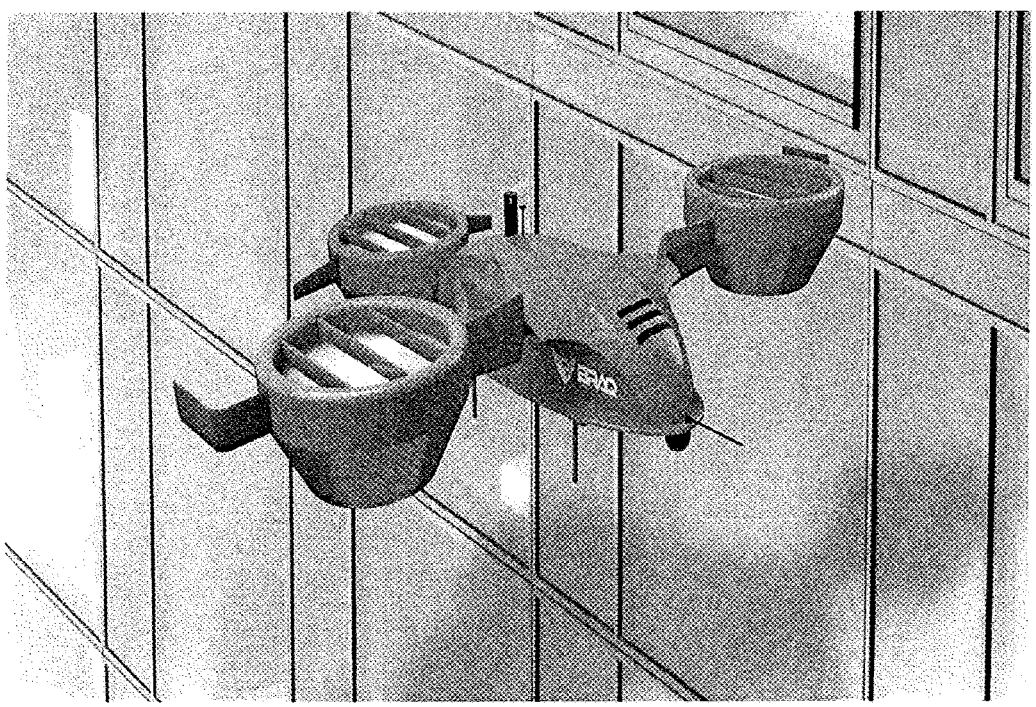
FIG. 33 illustrates a multi-mode UAV hovering in direct contact with a building according to one embodiment.

FIG. 33 illustrates multi-mode UAV hovering in direct contact with a building while in the VTOL mode. The left flexible rubber winglet 41 allows the multi-mode UAV 100 to hover in direct contact with the building to provide safer operations.

Embodiments described herein include a multi-mode UAV hybrid wing, configured to be attached at a side of an aerial vehicle fuselage, along with an opposing UAV hybrid wing on an opposite side of the aerial vehicle fuselage. The multi-mode UAV hybrid wing includes the benefits and capabilities provided by a fixed-wing configuration, a tilt-wing configuration, a ducted fan configuration, and a counter-rotating rotor configuration. This delivers a combined benefit of helicopters and fixed-wing aircrafts in a tilt-wing tri-ducted fan platform.

The multi-mode UAV hybrid wing configuration includes Blended Wing Body (BWB) Ogival Delta wings configured to extend from each side of an elongated fuselage. The UAV Blended Wing Body (BWB) Ogival Delta wings are doubled over the lateral axis of the multi-mode UAV. The multi-mode UAV hybrid wing configuration also includes a tilt wing attached at a first side to a free end of the UAV Ogival Delta wing. The tilt wing is configured to rotate between 0-135 degrees about the lateral axis of the multi-mode UAV. The tilt wing is controlled by a microcontroller unit (MCU) of the integrated autonomous flight control system 3430, which is linked to a set of servo controller units (SCUs) to manage the positions of all the servos, which results in rotating the tilt wing.

A duct is attached to a second side of the tilt wing. The duct includes a plurality of pivotal control surfaces positioned at a top entrance of the duct, dual counter-rotating rotors positioned at an underside of the duct, dual brushless electric motors or fuel-powered motors centrally located within the duct, a plurality of cross stators positioned at a back entrance of the duct, and a plurality of stator pivotal control surfaces within each of the cross stators of the duct. The plurality of pivotal control surfaces, the dual counter-rotating rotors, dual brushless electric motors or fuel-powered motors, the plurality of cross stators, and the plurality of stator pivotal control surfaces are controlled via processing circuitry of the integrated autonomous flight control system. The multi-mode UAV hybrid wing also includes a winglet attached to the duct opposite to the tilt wing.

In an embodiment, a tilting mechanism has a set of two digital fly-by-wire servo actuators, which are configured to rotate a first shaft integrated with the tilt wing. The tilting mechanism is also configured to rotate a second shaft with an opposite tilt wing and to rotate a vertically-oriented rear shaft with a tilt tail of a multi-mode UAV. In another embodiment, a material is integrated within walls of the diamond-shaped duct, such as a noise-blocking material or an insulation material.

Embodiments described herein include a multi-mode UAV hybrid tail, which is configured to be located at a rear side of a multi-mode UAV. The multi-mode UAV hybrid tail includes the benefits and capabilities provided by a ducted fan configuration and a counter-rotating rotor configuration.

The multi-mode UAV hybrid tail includes a tilt-tail section configured to fit within a curved guide slot at a rear end of an elongated fuselage. The tilt-tail section is configured to rotate within the curved guide slot between 0-90 degrees about the lateral axis of the multi-mode UAV.

The multi-mode UAV hybrid tail also includes a duct attached to the tilt-tail section at an opposite end to the curved guide slot. The duct includes a plurality of pivotal control surfaces positioned at a top entrance of the duct, dual counter-rotating rotors positioned at an underside of the duct, a plurality of cross stators positioned at a back entrance of the duct, and a plurality of stator pivotal control surfaces within each of the cross stators of the duct. The multi-mode UAV hybrid tail also includes a vertical stabilizer attached to the duct at an opposite side to the tilt-tail section, a first horizontal stabilizer attached to the duct at a first side, and a second horizontal stabilizer attached to the duct at a second opposite side.

In an embodiment, the multi-mode UAV hybrid tail also includes a tilting mechanism having a set of two digital fly-by-wire servo actuators and a rear shaft with the tilt-tail section. The tilting mechanism further links a first and a second shaft with an opposing pair of multi-mode UAV hybrid wings. In another embodiment, a material is integrated within walls of the duct, such as a noise-blocking material or an insulation material.

Figure 34:
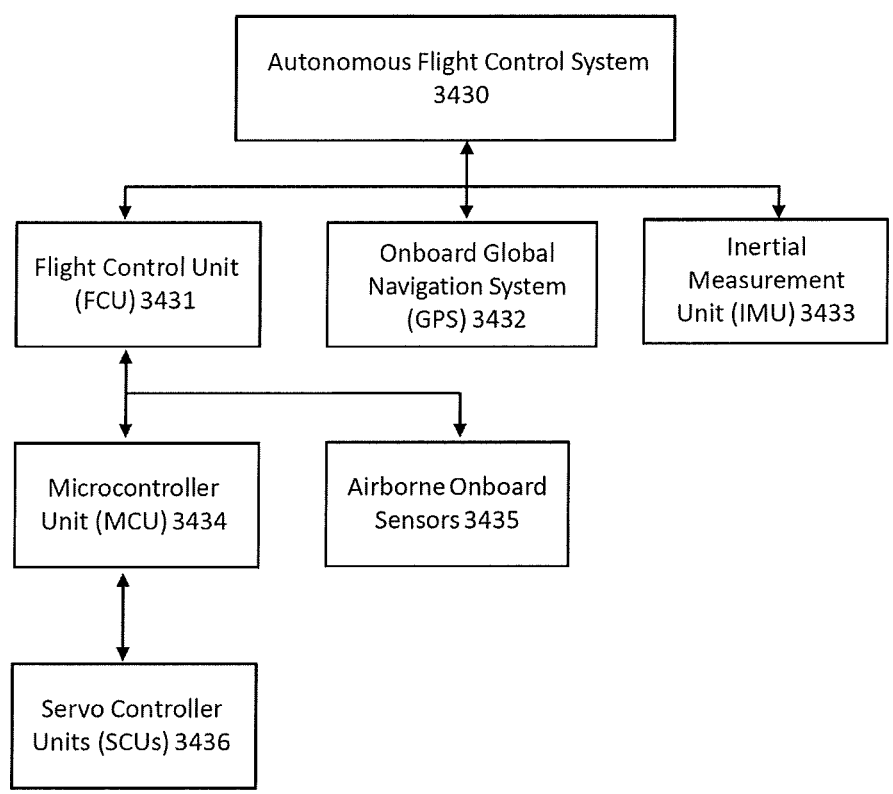
FIG. 34 illustrates a hardware description of an integrated autonomous flight control system according to one embodiment.

A hardware description is given with reference to FIG. 34 of an integrated autonomous flight control system 3430, which manages all aspects of flight (pitch, roll, yaw, speed, and cyclic). It also helps the UAV to identify obstacles and avoid potential collisions with other local vehicles flying in the same airspace class. The integrated autonomous flight control system 3430 includes a flight control unit (FCU) 3431 with onboard global navigation system (GPS) 3432, and an inertial measurement unit (IMU) 3433 to control the motors (pitch, roll, yaw, speed, and cyclic).

The integrated autonomous flight control system 3430 also has a microcontroller unit (MCU) 3434 to control the small tilt-wings and the tilt-tail digital fly-by-wire servo actuators and the small servo actuators that tilt/rotate the pivotable control surfaces. The MCU 3434 is linked to a set of servo controller units (SCUs) 3436 to manage the positions of all the servos. Furthermore, the integrated autonomous flight control system 3430 is linked to a plurality of airborne onboard sensors 3435, such as a speed sensor, an altimeter, an air pressure sensor, a static air pressure sensor, a differential air pressure sensor, an inertial measurement unit (IMU), a magnetometer, a light detection and ranging (LIDAR) sensor, dual IR/EO sensors, etc. These sensors work in conjunction with the integrated autonomous flight control system 3430 to detect, sense, see, avoid and make decisions.

The autonomous flight control system 3430 makes the UAV described herein a prime candidate for a range of military and commercial UAV applications, while also maintaining Federal Aviation Administration (FAA) guidelines. It also avoids minimum aviation system performance standards (MASPS) and the small unmanned regulations (Part 107) for UAVs operating in the national airspace system (NAS). As a result, the UAV described herein can fly beyond visual line of sight (BVLOS) and navigate autonomously between buildings, walls, pipes, trees, and cables while flying in outdoor environments, indoor environments, and complex urban areas. The processing circuitry of the integrated autonomous flight control system 3430 represents hardware and software components, whereby elements of disclosures noted herein are programmed. The programming in hardware and software constitutes algorithmic instructions to execute the various functions and acts noted and described herein.

Figure 35:
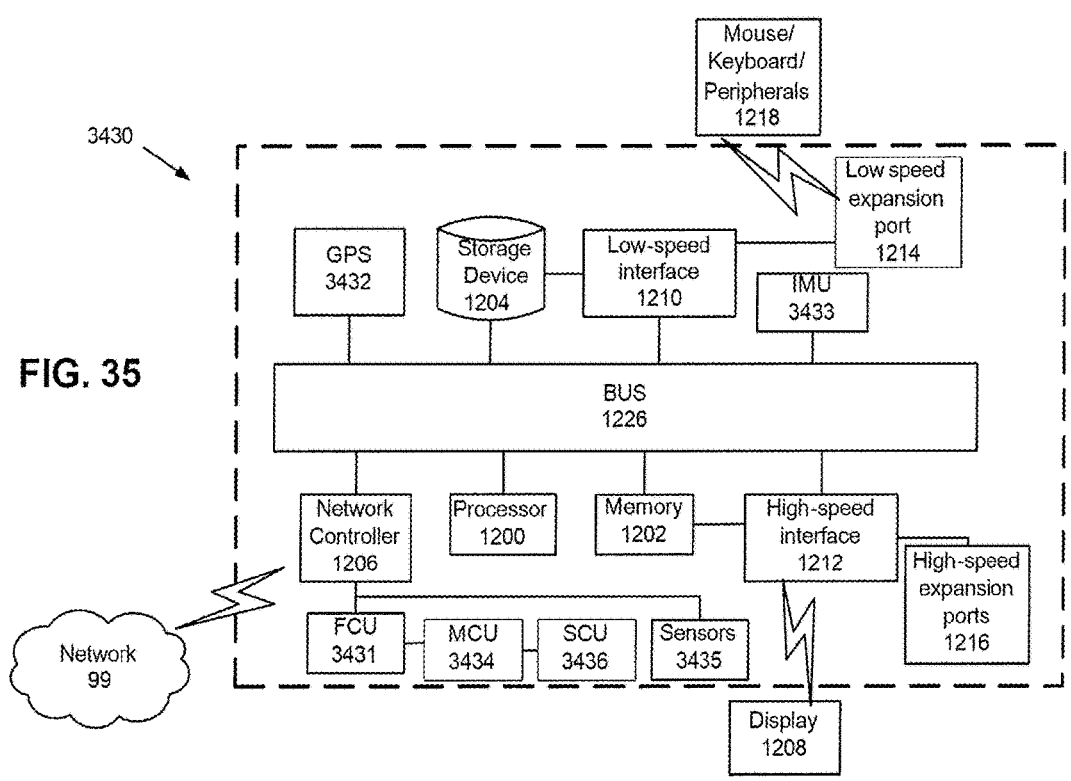
FIG. 35 illustrates a schematic of an exemplary computing device according to one embodiment

FIG. 35 is a schematic of an exemplary computing device, such as the autonomous flight control system 3430, which can be used to implement the techniques described in this disclosure. The autonomous flight control system 3430 is intended to represent various forms of digital hardware, such as servers, blade servers, mainframes, and other appropriate computers. The components shown here, their connections and relationships, and their functions are meant to be examples only and are not meant to be limiting.

The autonomous flight control system 3430 includes a processor 1200, a memory 1202, a storage device 1204, a high-speed interface 1212 connecting to the memory 1202 and to multiple high-speed expansion ports 1216, and a low-speed interface 1210 connecting to a low-speed expansion port 1214 and the storage device 1204. Each of the processor 1200, the memory 1202, the storage device 1204, the high-speed interface 1212, the high-speed expansion ports 1216, and the low-speed interface 1210 are interconnected using various busses, such as communication bus 1226, and may be mounted on a common motherboard or in other manners as appropriate. The GPS 3432 and the IMU 3433 are also connected to bus 1226.

The processor 1200 can process instructions for execution within autonomous flight control system 3430, including instructions stored in the memory 1202 or on the storage device 1204 to display graphical information for a GUI on an external input/output device, such as a display 1208 coupled to the high-speed interface 1212. In an embodiment for UAV 100, a connection from the high-speed interface 1212 to the display 1208 is a wireless connection. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 1202 stores information within the autonomous flight control system 3430. In some implementations, the memory 1202 is a volatile memory unit or units. In some implementations, the memory 1202 is a non-volatile memory unit or units. The memory 1202 can also be another form of computer-readable medium, such as a magnetic or optical disk.

The storage device 1204 is capable of providing mass storage for autonomous flight control system 3430. In some implementations, the storage device 1204 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 1200), perform one or more methods, such as those described above. The instructions can also be stored by one or more storage devices, such as computer- or machine-readable mediums (for example, the memory 1202, the storage device 1204, or memory on the processor 1200).

The high-speed interface 1212 manages bandwidth-intensive operations for autonomous flight control system 3430, while the low-speed interface 1210 manages lower bandwidth-intensive operations. Such allocation of functions is an example only. In some implementations, the high-speed interface 1212 is coupled to the memory 1202, the display 1208 (e.g., through a graphics processor or accelerator), and to the high-speed expansion ports 1216, which may accept various expansion cards (not shown). In the implementation, the low-speed interface 1210 is coupled to the storage device 1204 and the low-speed expansion port 1214. The low-speed expansion port 1214, which can include various communication ports (e.g., USB, Bluetooth, Ethernet, wireless Ethernet) can be coupled to one or more input/output devices 1218, such as a keyboard, a pointing device, a scanner, or a networking device such as a switch or router, e.g., through a network adapter. In an embodiment for UAV 100, a connection from the low-speed expansion port 1214 to the one or more input/output devices 1218 is a wireless connection.

Autonomous flight control system 3430 also includes a network controller 1206, such as an Intel Ethernet PRO network interface card from Intel Corporation of America, for interfacing with a network 99. The FCU 3431 is connected to network controller 1206. The FCU 3431 also has connections to the MCU 3434 and the one or more SCUs 3436. Airborne onboard sensors 3435 are also connected from the network controller 1206.

As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the autonomous flight control system 3430 of FIG. 12 is described as having a storage medium device 1204, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 1208 (e.g., a CRT (cathode ray tube) or LCD (liquid crystal display) monitor) for displaying information to the user and a keyboard and a pointing device 1218 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Conventional fixed-wing aircrafts, seaplanes, and hovering aircrafts are generally designed for specific functions and are therefore, not conveniently capable of performing a multiplicity of functions. The multi-mode UAV described herein has the flexibility and attributes of helicopters, fixed-wing aircrafts, and WIG vehicles. The multi-mode UAV is comparable in mission and output to helicopters, fixed-wing aircrafts, seaplanes, and hovering aircrafts combined.

In addition to the combined hybrid aerial vehicle features, embodiments described herein for an UAV include electric slidable landing gear legs sliding or rotating up when the vehicle is flying or landing on water surfaces. The electric slidable landing gear legs also slide or rotate down when the vehicle is preparing to land on highways or on uneven surfaces.

Embodiments described herein describe a new way of using UAVs for cargo and goods delivery services from one location to another in which either location is typically difficult to access, such as inside a complex urban area, in close air spaces for military facilities and important civilian installations, and in natural environments.

The UAV described herein can be used as a small civil or commercial UAV platform for a range of high risk and labor-intensive industries and applications, such as oil and gas, infrastructure monitoring, precision agriculture, search and rescue (SAR), law enforcement, customs and border protection, fire detection and retardant deployment, disaster management, cargo and goods delivery, science and research, mapping and surveying, and aerial photography.

The UAV described herein can also be used as a medium-altitude long-endurance (MALE) UAV military platform, facilitating point to point logistic support, destroying targets, intelligence surveillance and reconnaissance (ISR) missions, troop supply missions, and humanitarian aid responses.

Embodiments described herein provide safer and quieter flight capabilities that are largely unmatched in most of the existing UAVs. The safety is improved by enclosing the rotors and motors inside of the diamond-shaped ducts, which prevents the engines and rotors from contacting other objects and prevents foreign object damage (FOD) to the rotors. The sets of three pivotal control surfaces evenly and vertically positioned at the top entrance of the diamond-shaped ducts, in addition to the set of large horizontally and vertically positioned stators at the exit end of the diamond-shaped ducts, are optimized to reduce the chances of FOD entering one of the diamond-shaped ducts and striking a blade. The diamond-shaped ducts also secure the rotors and the motors from birds, cables, trees, and other hazards during flight, take-off, and landing. As a result, the UAV described herein is more robust and rugged.

The two large flexible rubber winglets attached to the right and left diamond-shaped ducts provide more aerodynamic efficiency in the HTOL mode. The two large flexible rubber winglets also enable the UAV to hover in direct contact with an object, such as a building, wall, or pipe while in the VTOL mode, which acts as a bumper crash guard for the UAV. This feature provides a high safety level while operating the UAV while in confined spaces and in close quarters to obstructions, residences, and people.

The diamond-shaped duct configuration optimizes a reduction in noise levels while operating inside of a complex urban area, as well as close air spaces for military facilities and civilian installations. The diamond-shaped duct walls allow noise to be reduced by various acoustic treatments to deflect and absorb noise, and by utilizing noise-blocking and insulation material integrated within the duct walls. This offers better noise insulation as compared to conventional UAVs.

The embodiments described herein include the aspects listed below.

(1) A multi-mode unmanned aerial vehicle, including: an elongated fuselage having a front end, a rear end with a curved guide slot, a right side, a left side, and a WIG-effect bottom; a right-fixed wing extending from the right side of the elongated fuselage; a right tilt wing attached at a first side to a free end of the right fixed wing, the right tilt wing being rotatable in a range of 0-135 degrees about a lateral axis of the multi-mode unmanned aerial vehicle; a right duct attached to a second side of the right tilt wing; a right winglet attached to the right duct opposite to the right tilt wing; a left-fixed wing extending from the left side of the elongated fuselage; a left tilt wing attached at a first side to a free end of the left fixed wing, the left tilt wing being rotatable in a range of 0-135 degrees about the lateral axis of the multi-mode unmanned aerial vehicle; a left duct attached to a second side of the left tilt wing; a left winglet attached to the left duct opposite to the left tilt wing; a tilt tail located within the curved guide slot at the rear end of the elongated fuselage, the tilt tail being rotatable in a range of 0-90 degrees about the lateral axis of the multi-mode unmanned aerial vehicle and within the curved guide slot, wherein the tilt tail includes a vertical stabilizer, a right horizontal stabilizer, and a left horizontal stabilizer; a rear duct attached to the tilt tail; a tilting mechanism having a first set of servo actuators connected via a bevel gear group to a right and left set of horizontally-oriented shafts integrated with the right tilt wing and the left tilt wing respectively, a set of pulleys connected to the right and left set of horizontally-oriented shafts, and a second set of servo actuators connected to a rear shaft integrated with the tilt tail; and an integrated autonomous flight control system including processing circuitry configured to control flight and navigation of the multi-mode unmanned aerial vehicle and to control the tilting mechanism.

(2) The multi-mode unmanned aerial vehicle of (1), further including a plurality of pivotal control surfaces positioned at a top entrance of the right duct, dual counter-rotating rotors positioned at an underside of the right duct, an engine centrally located within the right duct, a plurality of cross stators positioned at a back entrance of the right duct, and a plurality of stator pivotal control surfaces within each of the cross stators of the right duct.

(3) The multi-mode unmanned aerial vehicle of either (1) or (2), further including a plurality of pivotal control surfaces positioned at a top entrance of the left duct, dual counter-rotating rotors positioned at an underside of the left duct, an engine centrally located within the left duct, a plurality of cross stators positioned at a back entrance of the left duct, and a plurality of stator pivotal control surfaces within each of the cross stators of the left duct.

(4) The multi-mode unmanned aerial vehicle of any one of (1) through (3), further including a plurality of pivotal control surfaces positioned at a top entrance of the rear duct, dual counter-rotating rotors positioned at an underside of the rear duct, an engine centrally located within the rear duct, a plurality of cross stators positioned at a back entrance of the rear duct, and a plurality of stator pivotal control surfaces within each of the cross stators of the rear duct.

(5) The multi-mode unmanned aerial vehicle of any one of (1) through (4), wherein each of the right tilt wing, the left tilt wing, and the tilt tail are configured to rotate for VTOL, STOL, and HTOL.

(6) The multi-mode unmanned aerial vehicle of any one of (1) through (5), wherein the WIG-effect bottom includes a surrounding ring cavity, at least one bottom stabilizer, and at least one rear stabilizer.

(7) The multi-mode unmanned aerial vehicle of any one of (1) through (6), wherein the WIG-effect bottom facilitates water landings and cruises over a water surface.

(8) The multi-mode unmanned aerial vehicle of any one of (1) through (7), further including a slidable landing gear assembly.

(9) The multi-mode unmanned aerial vehicle of any one of (1) through (8), wherein the slidable landing gear assembly includes a plurality of inner leg members adjustable and slidable within corresponding outer leg members attached to the WIG-effect bottom, a loading force-sensitive contact sensor attached to a bottom end of each of the inner leg members, and a foot attached to the bottom end of each of the inner leg members.

(10) The multi-mode unmanned aerial vehicle of any one of (1) through (9), wherein the slidable landing gear assembly includes one of an electric slidable landing gear assembly and a hydraulic slidable landing gear assembly.

(11) The multi-mode unmanned aerial vehicle of any one of (1) through (10), further including a front container hinged door assembly configured to house the tilting mechanism and the integrated autonomous flight control system.

(12) The multi-mode unmanned aerial vehicle of any one of (1) through (11), wherein the front container hinged door assembly includes two locking pins, two hinges, a cooling fan configured to cool the tilting mechanism and the integrated autonomous flight control system, and an air inlet with a filter.

(13) The multi-mode unmanned aerial vehicle of any one of (1) through (12), further including a front storage container for one or more of cargo and goods.

(14) The multi-mode unmanned aerial vehicle of any one of (1) through (13), wherein the multi-mode unmanned aerial vehicle includes an autonomously-controlled and gyroscopically-stabilized unmanned aerial vehicle.

(15) A multi-mode unmanned aerial vehicle (UAV), including an elongated fuselage having a front end, a rear end with a curved guide slot, a right side, a left side, and a wing-in-ground (WIG) effect bottom; a right-fixed wing extending from the right side of the elongated fuselage; a right tilt wing attached at a first side to a free end of the right fixed wing, the right tilt wing being rotatable in a range of 0-135 degrees about a lateral axis of the multi-mode UAV; a right duct attached to a second side of the right tilt wing; a right winglet attached to the right duct opposite to the right tilt wing; a left-fixed wing extending from the left side of the elongated fuselage; a left tilt wing attached at a first side to a free end of the left fixed wing, the left tilt wing being rotatable in a range of 0-135 degrees about the lateral axis of the multi-mode UAV; a left duct attached to a second side of the left tilt wing; a left winglet attached to the left duct opposite to the left tilt wing; a tilt tail located within the curved guide slot at the rear end of the elongated fuselage, the tilt tail being rotatable in a range of 0-90 degrees about the lateral axis of the multi-mode UAV and within the curved guide slot, wherein the tilt tail includes a vertical stabilizer, a right horizontal stabilizer, and a left horizontal stabilizer; a rear duct attached to the tilt tail; a tilting mechanism including a first set of servo actuators connected via a bevel gear group to a right and left set of horizontally-oriented shafts integrated with the right tilt wing and the left tilt wing, respectively, a set of pulleys connected to the right and left set of horizontally-oriented shafts, and a second set of servo actuators connected to a rear shaft integrated with the tilt tail; and processing circuitry configured to control pitch, roll, yaw, speed, and cyclic flight of the multi-mode UAV, control global navigation of the multi-mode UAV, control respective engines of the right duct, the left duct, and the rear duct, control the right tilt wing, the left tilt wing, and the rear tilt tail, control the first set of servo actuators and the second set of servo actuators, and control a plurality of onboard sensors of the multi-mode UAV.

(16) The multi-mode UAV of (15), wherein the plurality of onboard sensors include at least one type of a speed sensor, an altimeter, an air pressure sensor, a static air pressure sensor, a differential air pressure sensor, a magnetometer, a light detection and ranging (LIDAR) sensor, and dual IR/EO sensors.

(17) The multi-mode UAV of either (15) or (16), further including a front container hinged-door assembly configured to house the tilting mechanism and an integrated autonomous flight control system having the processing circuitry.

(18) The multi-mode UAV of any of (15) through (17), wherein the front container hinged-door assembly includes two locking pins, two hinges, a cooling fan configured to cool the tilting mechanism and the integrated autonomous flight control system, and an air inlet with a filter.

(19) The multi-mode UAV of any of (15) through (18), further including a front storage container configured to carry one or more of cargo, goods, and payloads.

(20) The multi-mode UAV of any of (15) through (19), wherein each of the right duct, the left duct, and the rear duct includes a plurality of pivotal control surfaces positioned at a top entrance of the respective right, left, and rear ducts, dual counter-rotating rotors positioned at an underside of the respective right, left, and rear ducts, an engine centrally located within the respective right, left, and rear ducts, a plurality of cross stators positioned at a back entrance of the respective right, left, and rear ducts, and a plurality of stator pivotal control surfaces within each of the cross stators of the respective right, left, and rear ducts.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative and not limiting thereof. The disclosure, including any readily discernible variants of the teachings herein, defines in part, the scope of the foregoing claim terminology.

The invention claimed is:

1. A multi-mode unmanned aerial vehicle, comprising:
   an elongated fuselage having a front end, a rear end with a curved guide slot, a right side, a left side, and a wing-in-ground (WIG) effect bottom;
   a right-fixed wing extending from the right side of the elongated fuselage;
   a right tilt wing attached at a first side to a free end of the right fixed wing, the right tilt wing being rotatable in a range of 0-135 degrees about a lateral axis of the multi-mode unmanned aerial vehicle;
   a right duct attached to a second side of the right tilt wing;
   a right winglet attached to the right duct opposite to the right tilt wing;
   a left-fixed wing extending from the left side of the elongated fuselage;
   a left tilt wing attached at a first side to a free end of the left fixed wing, the left tilt wing being rotatable in a range of 0-135 degrees about the lateral axis of the multi-mode unmanned aerial vehicle;
   a left duct attached to a second side of the left tilt wing;
   a left winglet attached to the left duct opposite to the left tilt wing;
   a tilt tail located within the curved guide slot at the rear end of the elongated fuselage, the tilt tail being rotatable in a range of 0-90 degrees about the lateral axis of the multi-mode unmanned aerial vehicle and within the curved guide slot, wherein the tilt tail includes a vertical stabilizer, a right horizontal stabilizer, and a left horizontal stabilizer;
   a rear duct attached to the tilt tail;
   a tilting mechanism including
      a first set of servo actuators connected via a bevel gear group to a right and left set of horizontally-oriented shafts integrated with the right tilt wing and the left tilt wing, respectively,
      a set of pulleys connected to the right and left set of horizontally-oriented shafts, and
      a second set of servo actuators connected to a rear shaft integrated with the tilt tail; and
   an integrated autonomous flight control system including processing circuitry configured to control flight and navigation of the multi-mode unmanned aerial vehicle and to control the tilting mechanism.

2. The multi-mode unmanned aerial vehicle of claim 1, further comprising:
   a plurality of pivotal control surfaces positioned at a top entrance of the right duct,
   dual counter-rotating rotors positioned at an underside of the right duct,
   an engine centrally located within the right duct,
   a plurality of cross stators positioned at a back entrance of the right duct, and
   a plurality of stator pivotal control surfaces within each of the cross stators of the right duct.

3. The multi-mode unmanned aerial vehicle of claim 2, further comprising:
   a plurality of pivotal control surfaces positioned at a top entrance of the left duct,
   dual counter-rotating rotors positioned at an underside of the left duct,
   an engine centrally located within the left duct,
   a plurality of cross stators positioned at a back entrance of the left duct, and
   a plurality of stator pivotal control surfaces within each of the cross stators of the left duct.

4. The multi-mode unmanned aerial vehicle of claim 3, further comprising:
   a plurality of pivotal control surfaces positioned at a top entrance of the rear duct,
   dual counter-rotating rotors positioned at an underside of the rear duct,
   an engine centrally located within the rear duct,
   a plurality of cross stators positioned at a back entrance of the rear duct, and
   a plurality of stator pivotal control surfaces within each of the cross stators of the rear duct.

5. The multi-mode unmanned aerial vehicle of claim 1, wherein each of the right tilt wing, the left tilt wing, and the tilt tail are configured to rotate for vertical take-off and landing (VTOL), short take-off and landing (STOL), and horizontal take-off and landing (HTOL).

6. The multi-mode unmanned aerial vehicle of claim 1, wherein the WIG-effect bottom includes
   a surrounding ring cavity,
   at least one bottom stabilizer, and
   at least one rear stabilizer.

7. The multi-mode unmanned aerial vehicle of claim 6, wherein the WIG-effect bottom facilitates water landings and cruises over a water surface.

8. The multi-mode unmanned aerial vehicle of claim 1, further comprising:
   a slidable landing gear assembly.

9. The multi-mode unmanned aerial vehicle of claim 8, wherein the slidable landing gear assembly includes
   a plurality of inner leg members adjustable and slidable within corresponding outer leg members attached to the WIG-effect bottom,
   a loading force-sensitive contact sensor attached to a bottom end of each of the inner leg members, and
   a foot attached to the bottom end of each of the inner leg members.

10. The multi-mode unmanned aerial vehicle of claim 8, wherein the slidable landing gear assembly includes one of an electric slidable landing gear assembly and a hydraulic slidable landing gear assembly.

11. The multi-mode unmanned aerial vehicle of claim 1, further comprising:
   a front container hinged-door assembly configured to house the tilting mechanism and the integrated autonomous flight control system.

12. The multi-mode unmanned aerial vehicle of claim 11, wherein the front container hinged-door assembly includes
   two locking pins,
   two hinges,
   a cooling fan configured to cool the tilting mechanism and the integrated autonomous flight control system, and
   an air inlet with a filter.

13. The multi-mode unmanned aerial vehicle of claim 1, further comprising:
   a front storage container for one or more of cargo and goods.

14. The multi-mode unmanned aerial vehicle of claim 1, wherein the multi-mode unmanned aerial vehicle includes an autonomously-controlled and gyroscopically-stabilized unmanned aerial vehicle.

15. A multi-mode unmanned aerial vehicle (UAV), comprising:
   an elongated fuselage having a front end, a rear end with a curved guide slot, a right side, a left side, and a wing-in-ground (WIG) effect bottom;
   a right-fixed wing extending from the right side of the elongated fuselage;

a right tilt wing attached at a first side to a free end of the right fixed wing, the right tilt wing being rotatable in a range of 0-135 degrees about a lateral axis of the multi-mode UAV;

a right duct attached to a second side of the right tilt wing;

a right winglet attached to the right duct opposite to the right tilt wing;

a left-fixed wing extending from the left side of the elongated fuselage;

a left tilt wing attached at a first side to a free end of the left fixed wing, the left tilt wing being rotatable in a range of 0-135 degrees about the lateral axis of the multi-mode UAV;

a left duct attached to a second side of the left tilt wing;

a left winglet attached to the left duct opposite to the left tilt wing;

a tilt tail located within the curved guide slot at the rear end of the elongated fuselage, the tilt tail being rotatable in a range of 0-90 degrees about the lateral axis of the multi-mode UAV and within the curved guide slot, wherein the tilt tail includes a vertical stabilizer, a right horizontal stabilizer, and a left horizontal stabilizer;

a rear duct attached to the tilt tail;

a tilting mechanism including
  a first set of servo actuators connected via a bevel gear group to a right and left set of horizontally-oriented shafts integrated with the right tilt wing and the left tilt wing, respectively,
  a set of pulleys connected to the right and left set of horizontally-oriented shafts, and
  a second set of servo actuators connected to a rear shaft integrated with the tilt tail; and processing circuitry configured to
  control pitch, roll, yaw, speed, and cyclic flight of the multi-mode UAV,
  control global navigation of the multi-mode UAV,
  control respective engines of the right duct, the left duct, and the rear duct,
  control the right tilt wing, the left tilt wing, and the rear tilt tail,
  control the first set of servo actuators and the second set of servo actuators, and
  control a plurality of onboard sensors of the multi-mode UAV.

16. The multi-mode UAV of claim 15, wherein the plurality of onboard sensors include at least one type of a speed sensor, an altimeter, an air pressure sensor, a static air pressure sensor, a differential air pressure sensor, a magnetometer, a light detection and ranging (LIDAR) sensor, and dual infrared/electro-optical IR/EO sensors.

17. The multi-mode UAV of claim 15, further comprising:
  a front container hinged-door assembly configured to house the tilting mechanism and an integrated autonomous flight control system having the processing circuitry.

18. The multi-mode UAV of claim 17, wherein the front container hinged-door assembly includes
  two locking pins,
  two hinges,
  a cooling fan configured to cool the tilting mechanism and the integrated autonomous flight control system, and
  an air inlet with a filter.

19. The multi-mode UAV of claim 15, further comprising:
  a front storage container configured to carry one or more of cargo, goods, and payloads.

20. The multi-mode unmanned aerial vehicle of claim 15, wherein each of the right duct, the left duct, and the rear duct includes
  a plurality of pivotal control surfaces positioned at a top entrance of the respective right, left, and rear ducts,
  dual counter-rotating rotors positioned at an underside of the respective right, left, and rear ducts,
  an engine centrally located within the respective right, left, and rear ducts,
  a plurality of cross stators positioned at a back entrance of the respective right, left, and rear ducts, and
  a plurality of stator pivotal control surfaces within each of the cross stators of the respective right, left, and rear ducts.

* * * * *